US010725650B2

(12) United States Patent
Fujita

(10) Patent No.: US 10,725,650 B2
(45) Date of Patent: Jul. 28, 2020

(54) HANDWRITTEN MUSIC SIGN RECOGNITION DEVICE AND PROGRAM

(71) Applicant: KABUSHIKI KAISHA KAWAI GAKKI SEISAKUSHO, Hamamatsu-shi, Shizuoka (JP)

(72) Inventor: Akihiro Fujita, Hamamatsu (JP)

(73) Assignee: KABUSHIKI KAISHA KAWAI GAKKI SEISAKUSHO, Hamamatsu-Shi (JP)

( * ) Notice: Subject to any disclaimer, the term of this patent is extended or adjusted under 35 U.S.C. 154(b) by 154 days.

(21) Appl. No.: 14/911,963

(22) PCT Filed: Jan. 15, 2015

(86) PCT No.: PCT/JP2015/050875
§ 371 (c)(1),
(2) Date: Feb. 12, 2016

(87) PCT Pub. No.: WO2015/141260
PCT Pub. Date: Sep. 24, 2015

(65) Prior Publication Data
US 2016/0202899 A1 Jul. 14, 2016

(30) Foreign Application Priority Data

Mar. 17, 2014 (JP) .................. 2014-054010
Mar. 28, 2014 (JP) .................. 2014-070018
Mar. 28, 2014 (JP) .................. 2014-070029

(51) Int. Cl.
G06F 3/0488 (2013.01)
G06T 11/20 (2006.01)
(Continued)

(52) U.S. Cl.
CPC ........ G06F 3/04883 (2013.01); G06F 40/171 (2020.01); G06K 9/00402 (2013.01);
(Continued)

(58) Field of Classification Search
CPC .. G10H 1/00; G10H 1/0008; G10H 2220/015; G10H 2220/096;
(Continued)

(56) References Cited

U.S. PATENT DOCUMENTS 3,541,511 A * 11/1970 Watanabe ............ G06K 9/4609
382/203
3,766,520 A * 10/1973 Patterson ................. G06K 9/48
382/198
(Continued)

FOREIGN PATENT DOCUMENTS

JP 63-095591 A 4/1988
JP 1-96770 A 4/1989
(Continued)

OTHER PUBLICATIONS

Mathcentre, Equations of straight lines, 2009, http://www.mathcentre.ac.uk/resources/uploaded/mc-ty-strtlines-2009-1.pdf (Year: 2009).*
(Continued)

Primary Examiner — Devona E Faulk
Assistant Examiner — Charles L Beard
(74) Attorney, Agent, or Firm — Birch, Stewart, Kolasch & Birch, LLP

(57) ABSTRACT

A handwritten music sign recognition device (10) has: a touch information obtaining part (21) which obtains, as position information, a position of an input means on a screen every time the input means moves, from when the input means touches the screen until when the input means is moved away therefrom; a vector information creation part (22) which creates attributes of a vector indicating a trace of movement of the input means as vector information based on the position information; and a stroke characteristic
(Continued)

amount derivation part (23) which derives a characteristic amount of a stroke based on the vector information included in the stroke information.

17 Claims, 29 Drawing Sheets

(51) Int. Cl.
 *G06K 9/00* (2006.01)
 *G10G 1/00* (2006.01)
 *G10H 1/00* (2006.01)
 *G06F 40/171* (2020.01)

(52) U.S. Cl.
 CPC ..... *G06K 9/00416* (2013.01); *G06K 9/00429* (2013.01); *G06T 11/203* (2013.01); *G10G 1/00* (2013.01); *G10H 1/0008* (2013.01); *G10H 2220/015* (2013.01); *G10H 2220/096* (2013.01); *G10H 2220/121* (2013.01); *G10H 2220/441* (2013.01)

(58) Field of Classification Search
 CPC ....... G10H 2220/121; G10H 2220/441; G10H 2220/126; G10H 2220/101; G10H 2220/091; G06F 17/242; G06F 3/04883; G06F 3/0488; G06F 3/017; G06F 3/0317; G06F 3/03545; G06F 3/041; G06F 3/042; G06F 3/048; G06F 3/047; G06T 11/203; G06T 11/206; G06T 11/20; G10G 1/00; G10G 1/04; G10G 3/00; G10G 3/04; G10G 1/02; G06K 9/00; G06K 9/00402; G06K 9/00416; G06K 9/00429; G06K 9/62; G06K 9/222; G06K 9/00409; G06K 9/00422; G06K 9/004236; G06K 9/00865; G06K 9/18; G06K 9/183; G06K 9/186; G06K 9/48
 See application file for complete search history.

(56) References Cited

U.S. PATENT DOCUMENTS

| | | | | |
|---|---|---|---|---|
| 3,863,218 A * | 1/1975 | Oka | ............... | G06K 9/481 382/198 |
| 3,979,722 A * | 9/1976 | Sakoe | ............... | G06K 9/6206 382/215 |
| 3,987,412 A * | 10/1976 | Morrin, II | ............... | G06K 9/481 382/242 |
| 4,040,009 A * | 8/1977 | Kadota | ............... | G06K 9/6857 382/227 |
| 4,124,871 A * | 11/1978 | Morrin, II | ............... | G06T 3/40 345/660 |
| 4,331,955 A * | 5/1982 | Hansen | ............... | G09G 1/14 345/472 |
| 4,468,808 A * | 8/1984 | Mori | ............... | G06K 9/48 382/185 |
| 4,542,526 A * | 9/1985 | Satoh | ............... | G06K 9/46 382/187 |
| 4,573,196 A * | 2/1986 | Crane | ............... | G06K 9/6807 382/185 |
| 4,628,532 A * | 12/1986 | Stone | ............... | G06K 9/481 382/197 |
| 4,653,107 A * | 3/1987 | Shojima | ............... | G06K 9/00402 382/189 |
| 4,685,142 A * | 8/1987 | Ooi | ............... | G06K 9/6202 382/185 |
| 4,718,103 A * | 1/1988 | Shojima | ............... | G06K 9/6206 382/189 |
| 4,891,750 A * | 1/1990 | Pastor | ............... | G06K 9/4604 382/197 |
| 4,979,226 A * | 12/1990 | Sato | ............... | G06K 9/6206 382/197 |
| 4,987,603 A * | 1/1991 | Ohnishi | ............... | G06K 9/4604 382/203 |
| 5,007,098 A * | 4/1991 | Kumagai | ............... | G06K 9/481 382/185 |
| 5,038,382 A * | 8/1991 | Lipscomb | ............... | G06K 9/00416 382/189 |
| 5,070,466 A * | 12/1991 | Anderson | ............... | G06T 11/203 345/418 |
| 5,105,470 A * | 4/1992 | Will | ............... | G06K 9/50 382/186 |
| 5,113,452 A * | 5/1992 | Chatani | ............... | G06K 9/222 382/187 |
| 5,265,174 A * | 11/1993 | Nakatsuka | ............... | G06K 9/00429 382/189 |
| 5,313,528 A * | 5/1994 | Nishida | ............... | G06K 9/00429 382/187 |
| 5,414,228 A * | 5/1995 | Yamashita | ............... | G06K 9/00409 345/17 |
| 5,459,809 A * | 10/1995 | Kim | ............... | G06K 9/00879 382/160 |
| 5,468,077 A * | 11/1995 | Motokado | ............... | G06F 3/018 345/468 |
| 5,485,531 A * | 1/1996 | Ichinohe | ............... | G06K 9/4609 382/198 |
| 5,533,147 A * | 7/1996 | Arai | ............... | G06K 9/00416 382/179 |
| 5,579,408 A * | 11/1996 | Sakaguchi | ............... | G06K 9/4604 382/179 |
| 5,588,074 A * | 12/1996 | Sugiyama | ............... | G06K 9/6807 382/190 |
| 5,594,855 A * | 1/1997 | Von Ehr, II | ............... | G06T 11/203 345/442 |
| 5,596,656 A * | 1/1997 | Goldberg | ............... | G06F 3/04883 345/179 |
| 5,615,285 A * | 3/1997 | Beernink | ............... | G06K 9/222 382/189 |
| 5,644,652 A * | 7/1997 | Bellegarda | ............... | G06K 9/6297 382/186 |
| 5,665,927 A * | 9/1997 | Taki | ............... | G06K 9/00335 84/477 R |
| 5,727,140 A * | 3/1998 | Ohtomo | ............... | G06K 15/02 345/467 |
| 5,729,629 A * | 3/1998 | Dai | ............... | B01D 61/10 382/159 |
| 5,734,748 A * | 3/1998 | Amano | ............... | G06K 15/02 345/467 |
| 5,734,750 A * | 3/1998 | Arai | ............... | G06K 9/4604 382/187 |
| 5,742,705 A * | 4/1998 | Parthasarathy | ............... | G06K 9/6857 382/185 |
| 5,754,689 A * | 5/1998 | Niki | ............... | G06K 9/46 382/198 |
| 5,775,915 A * | 7/1998 | Quinn | ............... | G09B 15/001 434/156 |
| 5,852,680 A * | 12/1998 | Yoshida | ............... | G06K 15/02 382/258 |
| 5,862,251 A * | 1/1999 | Al-Karmi | ............... | G06K 9/00859 382/186 |
| 5,867,172 A * | 2/1999 | Fujisawa | ............... | G06T 11/203 345/467 |
| 5,907,630 A * | 5/1999 | Naoi | ............... | G06K 9/32 382/173 |
| 5,917,501 A * | 6/1999 | Muller | ............... | G06T 11/203 345/467 |
| 5,926,189 A * | 7/1999 | Beaman | ............... | G06T 11/203 345/467 |
| 5,940,081 A * | 8/1999 | Guo | ............... | G06T 11/203 345/442 |
| 5,940,084 A * | 8/1999 | Motokado | ............... | G06T 11/203 345/441 |
| 5,940,535 A * | 8/1999 | Huang | ............... | G06K 9/6284 382/179 |
| 5,959,634 A * | 9/1999 | Yoshida | ............... | G06K 15/02 345/467 |

(56) References Cited

U.S. PATENT DOCUMENTS

| | | | | |
|---|---|---|---|---|
| 5,982,387 A * | 11/1999 | Hellmann | G06K 15/02 | 345/467 |
| 5,982,933 A * | 11/1999 | Yoshii | G06K 9/6255 | 382/190 |
| 6,005,976 A * | 12/1999 | Naoi | G06K 9/346 | 382/174 |
| 6,035,063 A * | 3/2000 | Nakashima | G06K 9/00429 | 382/187 |
| 6,041,137 A * | 3/2000 | Van Kleeck | G06K 9/6255 | 382/185 |
| 6,051,770 A * | 4/2000 | Milburn | G10H 1/00 | 84/611 |
| 6,052,482 A * | 4/2000 | Arai | G06K 9/6253 | 382/187 |
| 6,055,332 A * | 4/2000 | Aitani | G06K 9/00429 | 382/181 |
| 6,072,114 A * | 6/2000 | Kunimasa | G09B 15/023 | 434/307 A |
| 6,144,764 A * | 11/2000 | Yamakawa | G06K 9/00416 | 382/187 |
| 6,201,174 B1 * | 3/2001 | Eller | G09B 15/003 | 84/454 |
| 6,201,553 B1 * | 3/2001 | Morooka | G06T 11/001 | 345/468 |
| 6,226,403 B1 * | 5/2001 | Parthasarathy | G06K 9/4604 | 345/171 |
| 6,232,987 B1 * | 5/2001 | Choi | G06K 15/02 | 345/467 |
| 6,275,237 B1 * | 8/2001 | Wu | G06T 11/203 | 345/440 |
| 6,275,611 B1 * | 8/2001 | Parthasarathy | G06K 9/4604 | 382/187 |
| 6,285,785 B1 * | 9/2001 | Bellegarda | G06K 9/00 | 382/187 |
| 6,289,124 B1 * | 9/2001 | Okamoto | G06K 9/222 | 382/187 |
| 6,292,179 B1 * | 9/2001 | Lee | G06F 3/0236 | 345/168 |
| 6,348,648 B1 * | 2/2002 | Connick, Jr. | G09B 15/023 | 84/477 R |
| 6,370,269 B1 * | 4/2002 | Al-Karmi | G06K 9/00879 | 382/186 |
| 6,373,473 B1 * | 4/2002 | Sakaguchi | G06F 17/30259 | 345/173 |
| 6,421,461 B1 * | 7/2002 | Arai | G06K 9/6255 | 382/187 |
| 6,464,585 B1 * | 10/2002 | Miyamoto | G10H 1/0008 | 463/30 |
| 6,493,464 B1 * | 12/2002 | Hawkins | G06K 9/00429 | 382/189 |
| 6,498,608 B1 * | 12/2002 | Dresevic | G06F 17/214 | 345/467 |
| 6,502,114 B1 * | 12/2002 | Forcier | G06F 3/0488 | 715/273 |
| 6,538,187 B2 * | 3/2003 | Beigi | G09B 15/023 | 84/475 |
| 6,594,023 B1 * | 7/2003 | Omura | G06F 3/0423 | 345/157 |
| 6,597,360 B1 * | 7/2003 | Stamm | G06T 11/203 | 345/467 |
| 6,694,056 B1 * | 2/2004 | Ito | G06K 9/222 | 382/186 |
| 6,721,452 B2 * | 4/2004 | Confer | G06K 9/222 | 382/197 |
| 6,760,028 B1 * | 7/2004 | Salesin | G06T 11/203 | 345/467 |
| 6,937,239 B1 * | 8/2005 | Browne | G06T 11/203 | 345/442 |
| 6,952,210 B1 * | 10/2005 | Renner | G06T 11/203 | 345/471 |
| 6,956,968 B1 * | 10/2005 | O'Dell | G06F 3/0237 | 382/182 |
| 6,968,083 B2 * | 11/2005 | Williams | G06K 9/222 | 382/187 |
| 6,970,599 B2 * | 11/2005 | Longe | G06F 3/018 | 382/185 |
| 6,992,671 B1 * | 1/2006 | Corona | G06T 9/20 | 345/467 |
| 7,146,046 B2 * | 12/2006 | Biswas | G06K 9/222 | 382/195 |
| 7,149,356 B2 * | 12/2006 | Clark | G06K 9/3241 | 382/209 |
| 7,238,876 B1 * | 7/2007 | Worrall | G10H 1/0016 | 84/477 R |
| 7,251,365 B2 * | 7/2007 | Fux | G06F 17/214 | 345/467 |
| 7,289,123 B2 * | 10/2007 | Duggan | G06T 11/203 | 345/467 |
| 7,302,099 B2 * | 11/2007 | Zhang | G06K 9/222 | 382/185 |
| 7,330,605 B2 * | 2/2008 | Wang | G06F 3/03545 | 345/180 |
| 7,369,702 B2 * | 5/2008 | Abdulkader | G06K 9/6835 | 382/161 |
| 7,432,432 B2 * | 10/2008 | Li | G06K 9/00416 | 84/470 R |
| 7,495,164 B2 * | 2/2009 | Funaki | G09B 15/00 | 84/600 |
| 7,500,187 B1 * | 3/2009 | Karimoto | G06F 17/243 | 715/255 |
| 7,567,238 B2 * | 7/2009 | Sugimoto | G06F 3/0488 | 345/173 |
| 7,729,539 B2 * | 6/2010 | Lin | G06K 9/22 | 382/181 |
| 7,750,891 B2 * | 7/2010 | Stephanick | G06F 3/0236 | 178/18.01 |
| 7,762,893 B2 * | 7/2010 | Kando | A63F 13/10 | 463/37 |
| 7,771,279 B2 * | 8/2010 | Miyamoto | A63F 13/10 | 463/31 |
| 7,885,464 B2 * | 2/2011 | Kawamura | G06K 9/222 | 382/186 |
| 7,927,215 B2 * | 4/2011 | Sekimori | A63F 13/00 | 463/32 |
| 8,024,775 B2 * | 9/2011 | Xu | G06K 9/00154 | 713/182 |
| 8,053,657 B2 * | 11/2011 | Sitrick | G09B 15/002 | 84/470 R |
| 8,102,397 B2 * | 1/2012 | Perry | G06T 11/203 | 345/467 |
| 8,123,601 B2 * | 2/2012 | Kondo | A63F 13/10 | 463/4 |
| 8,150,160 B2 * | 4/2012 | Al-Muhtaseb | G06K 9/6297 | 382/185 |
| 8,445,766 B2 * | 5/2013 | Raveendran | G10G 1/00 | 84/470 R |
| 8,558,792 B2 * | 10/2013 | Momose | A63F 13/10 | 345/162 |
| 8,610,744 B2 * | 12/2013 | Harris | G06F 3/04883 | 345/661 |
| 8,744,136 B2 * | 6/2014 | Katsuta | G06K 9/00 | 382/100 |
| 8,781,227 B2 * | 7/2014 | Sun | G06K 9/00402 | 382/177 |
| 8,830,167 B2 * | 9/2014 | Ninjouji | G06F 3/01 | 345/156 |
| 8,866,820 B2 * | 10/2014 | Terazono | G06T 9/005 | 345/467 |
| 8,882,590 B2 * | 11/2014 | Shimura | A63F 13/10 | 463/31 |
| 8,884,916 B2 * | 11/2014 | Worfolk | G06F 3/044 | 345/174 |
| 9,070,224 B1 * | 6/2015 | Esfahbod MirHosseinzadeh Sarabi | G06T 11/20 | |
| 9,183,754 B2 * | 11/2015 | Tanaka | G09B 15/023 | |
| 9,195,887 B2 * | 11/2015 | Shibata | G06K 9/00402 | |
| 9,274,607 B2 * | 3/2016 | DeLean | G06F 3/017 | |
| 9,275,274 B2 * | 3/2016 | Cheng | G06K 9/00355 | |

(56) References Cited

U.S. PATENT DOCUMENTS

| | | | | |
|---|---|---|---|---|
| 9,298,365 B2* | 3/2016 | Takasugi | G06F 3/04883 |
| 9,323,726 B1* | 4/2016 | Joshi | G06K 9/4671 |
| 9,339,725 B2* | 5/2016 | Ohta | A63F 13/215 |
| 9,424,823 B2* | 8/2016 | Valente | G06F 3/03545 |
| 9,478,201 B1* | 10/2016 | Begelfor | G06K 9/00 |
| 9,601,029 B2 | 3/2017 | Gebauer | |
| 9,613,444 B2* | 4/2017 | Makino | G06T 11/20 |
| 9,711,117 B2* | 7/2017 | Valente | G06F 3/03545 |
| 9,851,880 B2* | 12/2017 | Kim | G06F 3/04845 |
| 9,911,354 B2* | 3/2018 | Oliver | G09B 15/023 |
| 9,922,629 B1* | 3/2018 | Whiteside | G10G 1/00 |
| 9,934,768 B2* | 4/2018 | Uemura | G10G 1/00 |
| 2002/0049795 A1* | 4/2002 | Freeman | G06F 3/0237 715/256 |
| 2002/0064308 A1* | 5/2002 | Altman | G06K 9/00442 382/187 |
| 2002/0071607 A1* | 6/2002 | Kawamura | G06K 9/222 382/187 |
| 2002/0085003 A1* | 7/2002 | Nagashima | G06T 11/001 345/441 |
| 2002/0088334 A1* | 7/2002 | Mohammad Beigi | G09B 15/023 84/478 |
| 2002/0114394 A1* | 8/2002 | Ma | H04N 19/51 375/240.16 |
| 2002/0180797 A1* | 12/2002 | Bachmann | G06F 3/0236 715/780 |
| 2003/0086611 A1* | 5/2003 | Loudon | G06K 9/342 382/186 |
| 2003/0156145 A1* | 8/2003 | Hullender | G06F 3/04883 715/863 |
| 2003/0185444 A1* | 10/2003 | Honda | G06F 3/04883 382/186 |
| 2003/0215138 A1* | 11/2003 | Raghupathy | G06K 9/222 382/186 |
| 2003/0215139 A1* | 11/2003 | Shilman | G06K 9/00409 382/186 |
| 2003/0215140 A1* | 11/2003 | Gounares | G06F 3/0481 382/187 |
| 2003/0215145 A1* | 11/2003 | Shilman | G06F 3/04883 382/195 |
| 2004/0006749 A1* | 1/2004 | Fux | G06F 17/214 715/263 |
| 2004/0041811 A1* | 3/2004 | Lin | G06T 11/203 345/467 |
| 2004/0117724 A1* | 6/2004 | Szilagyi | G06F 17/242 715/200 |
| 2004/0140977 A1* | 7/2004 | Hakamada | G06T 11/203 345/467 |
| 2005/0088420 A1* | 4/2005 | Dodge | G06F 3/038 345/173 |
| 2005/0108004 A1* | 5/2005 | Otani | G10L 15/1807 704/205 |
| 2005/0159223 A1* | 7/2005 | Tahara | A63F 13/10 463/43 |
| 2005/0164794 A1* | 7/2005 | Tahara | A63F 13/06 463/43 |
| 2006/0062462 A1* | 3/2006 | Li | G06K 9/00416 382/186 |
| 2006/0170683 A1* | 8/2006 | Lin | G06T 11/203 345/467 |
| 2006/0210172 A1* | 9/2006 | Sutanto | G06K 9/00416 382/229 |
| 2006/0218171 A1* | 9/2006 | Wakeam | G06K 9/00409 |
| 2006/0242349 A1* | 10/2006 | Ewanchuk | G06T 11/203 710/305 |
| 2006/0245639 A1* | 11/2006 | Jiang | G06K 9/00208 382/154 |
| 2007/0183665 A1* | 8/2007 | Yuasa | G06K 9/00214 382/195 |
| 2007/0234878 A1* | 10/2007 | Worrall | G10H 1/0016 84/485 R |
| 2008/0007199 A1* | 1/2008 | Kasaoka | H02P 21/0089 318/807 |
| 2008/0117214 A1* | 5/2008 | Perani | G06T 11/206 345/441 |
| 2008/0165141 A1* | 7/2008 | Christie | G06F 3/044 345/173 |
| 2008/0198165 A1* | 8/2008 | Sawazaki | G06T 15/005 345/467 |
| 2008/0304748 A1* | 12/2008 | Koubaroulis | G06K 9/00409 382/186 |
| 2009/0021530 A1* | 1/2009 | Ishiguro | G06F 3/04883 345/619 |
| 2009/0136136 A1* | 5/2009 | Mori | G06K 9/00416 382/187 |
| 2009/0138830 A1* | 5/2009 | Borgaonkar | G06F 3/04883 715/863 |
| 2009/0148017 A1* | 6/2009 | Inoue | A61B 1/04 382/128 |
| 2009/0160376 A1* | 6/2009 | Yamada | H02P 27/12 318/400.02 |
| 2009/0288889 A1* | 11/2009 | Carlvik | G06F 3/04883 178/18.03 |
| 2009/0289902 A1* | 11/2009 | Carlvik | G06F 3/04883 345/173 |
| 2009/0309898 A1* | 12/2009 | Nakamura | G06T 11/203 345/647 |
| 2010/0005428 A1* | 1/2010 | Ikeda | G06F 3/04883 715/863 |
| 2010/0074527 A1* | 3/2010 | Vukosavljevic | G06F 17/215 382/187 |
| 2010/0137049 A1* | 6/2010 | Epstein | A63F 13/10 463/7 |
| 2010/0283766 A1* | 11/2010 | Shieh | G06F 3/03545 345/179 |
| 2010/0292008 A1* | 11/2010 | Matsumura | A63F 13/10 463/36 |
| 2011/0025693 A1* | 2/2011 | Merry | G06T 11/203 345/442 |
| 2011/0046942 A1* | 2/2011 | Zheng | G06F 17/276 704/8 |
| 2011/0066984 A1* | 3/2011 | Li | G06F 3/04883 715/863 |
| 2011/0122139 A1* | 5/2011 | Lee | G06T 11/203 345/441 |
| 2011/0167988 A1* | 7/2011 | Berkovitz | G09B 15/02 84/483.2 |
| 2011/0203442 A1* | 8/2011 | Raveendran | G09B 15/023 84/483.1 |
| 2011/0285634 A1* | 11/2011 | Lim | G06F 3/04883 345/169 |
| 2011/0298709 A1* | 12/2011 | Vaganov | G06F 3/03545 345/158 |
| 2012/0024128 A1* | 2/2012 | Takahashi | G10H 1/0008 84/600 |
| 2012/0038735 A1* | 2/2012 | Hasegawa | B41J 2/4753 347/217 |
| 2012/0176324 A1* | 7/2012 | Akiyama | G06F 3/0488 345/173 |
| 2012/0308127 A1* | 12/2012 | Kudoh | G06K 9/4652 382/165 |
| 2013/0120237 A1* | 5/2013 | Diverdi | G09G 5/00 345/156 |
| 2013/0127898 A1* | 5/2013 | DiVerdi | G06T 11/203 345/600 |
| 2013/0276619 A1* | 10/2013 | Fujita | G10H 7/00 84/609 |
| 2013/0293554 A1* | 11/2013 | Vostrikov | G06T 11/203 345/442 |
| 2013/0319209 A1* | 12/2013 | Good | G09B 15/04 84/483.2 |
| 2014/0000438 A1* | 1/2014 | Feis | G10G 1/00 84/453 |
| 2014/0022194 A1* | 1/2014 | Ito | G06F 3/0488 345/173 |
| 2014/0035844 A1* | 2/2014 | Zhang | G06F 3/04883 345/173 |

(56) References Cited

U.S. PATENT DOCUMENTS

| | | | |
|---|---|---|---|
| 2014/0043341 A1* | 2/2014 | Goel | G06T 1/00 345/501 |
| 2014/0071076 A1* | 3/2014 | Dogra | G06F 3/04883 345/173 |
| 2014/0075549 A1* | 3/2014 | Lewis | G06F 3/04883 726/19 |
| 2014/0104201 A1* | 4/2014 | Tsutsui | G06T 11/203 345/173 |
| 2014/0137029 A1* | 5/2014 | Stephenson | G06F 3/0482 715/784 |
| 2014/0160125 A1* | 6/2014 | Yoo | G06T 11/203 345/423 |
| 2014/0171153 A1* | 6/2014 | Kienzle | G06F 3/0237 455/566 |
| 2014/0267302 A1* | 9/2014 | Lubetkin | G06T 11/203 345/467 |
| 2014/0300554 A1* | 10/2014 | Samuel | G06F 21/32 345/173 |
| 2014/0300563 A1* | 10/2014 | Iwaki | G06F 17/241 345/173 |
| 2014/0325351 A1* | 10/2014 | Hirabayashi | G06K 9/222 715/273 |
| 2014/0340333 A1* | 11/2014 | Takasugi | G06F 3/04883 345/173 |
| 2014/0355884 A1* | 12/2014 | Tran | G06K 9/18 382/188 |
| 2014/0355885 A1* | 12/2014 | Shibata | G06K 9/00402 382/189 |
| 2015/0095822 A1* | 4/2015 | Feis | G10G 1/00 715/765 |
| 2015/0139547 A1* | 5/2015 | Yamaji | G06K 9/00416 382/186 |
| 2015/0179156 A1* | 6/2015 | Uemura | G06K 9/00476 84/609 |
| 2015/0228259 A1* | 8/2015 | Valente | G06F 3/03545 84/483.2 |
| 2015/0229369 A1* | 8/2015 | Honary | H04B 7/0417 375/267 |
| 2015/0235391 A1* | 8/2015 | Makino | G06T 11/203 345/629 |
| 2015/0302242 A1* | 10/2015 | Lee | G06K 9/00442 382/189 |
| 2015/0339524 A1* | 11/2015 | Yang | G06F 3/04883 382/189 |
| 2015/0346886 A1* | 12/2015 | Motoi | G06K 9/224 345/174 |
| 2015/0346995 A1* | 12/2015 | Sugiura | G06F 3/04883 715/863 |
| 2015/0347835 A1* | 12/2015 | Baba | G06K 9/00422 382/187 |
| 2016/0048324 A1* | 2/2016 | Fukui | G06F 3/04883 715/268 |
| 2016/0070952 A1* | 3/2016 | Kim | G06K 9/00208 382/118 |
| 2016/0092021 A1* | 3/2016 | Tu | G06F 3/0416 345/173 |
| 2016/0098594 A1* | 4/2016 | Sugiura | G06K 9/00422 382/189 |
| 2016/0117548 A1* | 4/2016 | Hirakawa | G06K 9/00402 382/187 |
| 2016/0124630 A1* | 5/2016 | Qian | G06F 3/04883 345/173 |
| 2016/0125578 A1* | 5/2016 | Ohki | G06K 9/52 382/187 |
| 2016/0147434 A1* | 5/2016 | Lee | G06F 17/242 715/838 |
| 2016/0162174 A1* | 6/2016 | Tsutsui | G06F 3/04883 345/173 |
| 2016/0188970 A1* | 6/2016 | Matsuda | G06K 9/00422 382/187 |
| 2016/0210452 A1* | 7/2016 | Pahud | G06F 21/32 |
| 2016/0364607 A1* | 12/2016 | VanBlon | G06F 3/0416 |
| 2016/0364892 A1* | 12/2016 | Huang | G06K 9/00442 |
| 2017/0004122 A1* | 1/2017 | Taniguchi | G06K 9/00416 |
| 2017/0243506 A1* | 8/2017 | Bayadzhan | G10H 1/0008 |
| 2017/0266558 A1* | 9/2017 | Rath | A63F 13/65 |
| 2018/0060689 A1* | 3/2018 | Sklaroff | G06T 11/203 |
| 2018/0061093 A1* | 3/2018 | Liu | G06T 11/203 |
| 2018/0095653 A1* | 4/2018 | Hasek | G06F 3/04883 |
| 2018/0129367 A1* | 5/2018 | Hatfield | G06F 3/04817 |
| 2018/0158230 A1* | 6/2018 | Yan | G06K 9/00268 |
| 2018/0225535 A1* | 8/2018 | Yamamoto | H04N 1/107 |
| 2019/0087654 A1* | 3/2019 | Xiao | G06K 9/00416 |

FOREIGN PATENT DOCUMENTS

| | | |
|---|---|---|
| JP | 05-135207 A | 6/1993 |
| JP | 5-225396 A | 9/1993 |
| JP | 8-180135 A | 7/1996 |
| JP | 10-55409 A | 2/1998 |
| JP | 10-105650 A | 4/1998 |
| JP | 2000-194796 A | 7/2000 |
| JP | 2001-184458 A | 7/2001 |
| JP | 2004-133951 A | 4/2004 |
| JP | 2007-200186 A | 8/2007 |
| JP | 2008-123182 A | 5/2008 |

OTHER PUBLICATIONS

Harvard, Multivariable calculus, 2011, http://www.math.kit.edu/ianm2/lehre/am22016s/media/distance-harvard.pdf (Year: 2011).*

International Search Report, dated Mar. 24, 2015, issued in PCT/JP2015/050875.

Written Opinion of the International Searching Authority, dated Mar. 24, 2015, issued in PCT/JP2015/050875.

English translation of the International Preliminary Report on Patentability and English translation of the Written Opinion of the International Searching Authority (PCT/IB/338, PCT/IB/373 and PCT/ISA/237), dated Sep. 29, 2016, for International Application No. PCT/JP2015/050875.

English Translation of Office Action, dated Apr. 24, 2018, issued in corresponding Japanese Application No. 2014-070029.

English Translation of Office Action, dated Mar. 6, 2018, issued in corresponding Japanese Application No. 2014-054010.

Japanese Office Action for corresponding Japanese Application No. 2014-054010, dated Sep. 4, 2018, with English translation.

* cited by examiner

FIG. 5

| | | | STROKE 0 | | | | | | | | | | | | STROKE 1 | STROKE 2 | STROKE 3 |
|---|---|---|---|---|---|---|---|---|---|---|---|---|---|---|---|---|---|
| VECTOR Index | | | 0 | 1 | 2 | 3 | 4 | 5 | 6 | 7 | 8 | 9 | 10 | 11 | 0 | 0 | 0 |
| VECTOR ID | | | 1 | 8 | 7 | 6 | 5 | 4 | 3 | 4 | 5 | 6 | 7 | 8 | 6 | 0 | 0 |
| STARTING POINT COORDINATES | X | | 424 | 421 | 405 | 339 | 327 | 326 | 353 | 414 | 425 | 425 | 392 | 351 | 466 | 301 | 428 |
| | Y | | 400 | 352 | 338 | 349 | 365 | 428 | 458 | 469 | 487 | 552 | 580 | 586 | 385 | 445 | 449 |
| END POINT COORDINATES | X | | 421 | 405 | 339 | 327 | 326 | 353 | 414 | 425 | 425 | 392 | 351 | 324 | 284 | 301 | 428 |
| | Y | | 352 | 338 | 349 | 365 | 428 | 458 | 469 | 552 | 552 | 580 | 586 | 533 | 507 | 445 | 449 |
| STARTING POINT–END POINT DISTANCE | | | \multicolumn{12}{c|}{200} | 219 | 0 | 0 |
| INSCRIBED RECTANGLE COORDINATES | | LEFT | \multicolumn{12}{c|}{324} | 284 | 301 | 428 |
| | | RIGHT | \multicolumn{12}{c|}{425} | 466 | 301 | 428 |
| | | UP | \multicolumn{12}{c|}{338} | 385 | 445 | 449 |
| | | DOWN | \multicolumn{12}{c|}{586} | 507 | 445 | 449 |
| | CENTER | X | \multicolumn{12}{c|}{375} | 375 | 301 | 428 |
| | | Y | \multicolumn{12}{c|}{426} | 446 | 445 | 449 |
| CONNECTION TYPE | | | 1 | 1 | 1 | 1 | 1 | 1 | 1 | 1 | 1 | 1 | 1 | 1 | 0 | 0 | 0 |
| ROTATION DIRECTION | | | 2 | 2 | 2 | 2 | 2 | 2 | 1 | 1 | 1 | 1 | 1 | 1 | 0 | 0 | 0 |
| ROTATION ANGLE(°) | | | −45 | −51 | −44 | −36 | −43 | −38 | 48 | 31 | 50 | 32 | 59 | 36 | 0 | 0 | 0 |
| LEFT-RIGHT MOVEMENT DIRECTION | | | 0 | 1 | 1 | 1 | 0 | 2 | 2 | 2 | 0 | 1 | 1 | 1 | 1 | 0 | 0 |
| UP-DOWN MOVEMENT DIRECTION | | | 1 | 1 | 1 | 1 | 0 | 2 | 2 | 2 | 0 | 1 | 1 | 1 | 2 | 0 | 0 |
| LEFTMOST POINT Index | | | \multicolumn{12}{c|}{5} | 0 | 0 | 0 |
| RIGHTMOST POINT Index | | | \multicolumn{12}{c|}{8} | 1 | 0 | 0 |
| HIGHEST POINT Index | | | \multicolumn{12}{c|}{2} | 0 | 0 | 0 |
| LOWEST POINT Index | | | \multicolumn{12}{c|}{11} | 1 | 0 | 0 |

| TARGET VECTOR ID | NEXT VECTOR ID | CONNECTION TYPE |
|---|---|---|
| POINT | | OBTUSE ANGLE |
| DOWN → UP | POINT | OBTUSE ANGLE |
| | DOWN → UP | |
| | LOWER LEFT → UPPER RIGHT | |
| | LOWER RIGHT → UPPER LEFT | |
| | RIGHT → LEFT | RIGHT ANGLE |
| | LEFT → RIGHT | |
| | OTHERS | ACUTE ANGLE |
| LOWER LEFT → UPPER RIGHT | POINT | OBTUSE ANGLE |
| | LOWER LEFT → UPPER RIGHT | |
| | DOWN → UP | |
| | LEFT → RIGHT | |
| | LOWER RIGHT → UPPER LEFT | RIGHT ANGLE |
| | UPPER LEFT → LOWER RIGHT | |
| | OTHERS | ACUTE ANGLE |
| LEFT → RIGHT | POINT | OBTUSE ANGLE |
| | LEFT → RIGHT | |
| | LOWER LEFT → UPPER RIGHT | |
| | UPPER LEFT → LOWER RIGHT | |
| | DOWN → UP | RIGHT ANGLE |
| | UP → DOWN | |
| | OTHERS | ACUTE ANGLE |
| UPPER LEFT → LOWER RIGHT | POINT | OBTUSE ANGLE |
| | UPPER LEFT → LOWER RIGHT | |
| | LEFT → RIGHT | |
| | UP → DOWN | |
| | LOWER LEFT → UPPER RIGHT | RIGHT ANGLE |
| | UPPER RIGHT → LOWER LEFT | |
| | OTHERS | ACUTE ANGLE |
| UP → DOWN | POINT | OBTUSE ANGLE |
| | UP → DOWN | |
| | UPPER LEFT → LOWER RIGHT | |
| | UPPER RIGHT → LOWER LEFT | |
| | LEFT → RIGHT | RIGHT ANGLE |
| | RIGHT → LEFT | |
| | OTHERS | ACUTE ANGLE |
| UPPER RIGHT → LOWER LEFT | POINT | OBTUSE ANGLE |
| | UPPER RIGHT → LOWER LEFT | |
| | UP → DOWN | |
| | DOWN → UP | |
| | UPPER LEFT → LOWER RIGHT | RIGHT ANGLE |
| | LOWER RIGHT → UPPER LEFT | |
| | OTHERS | ACUTE ANGLE |
| RIGHT → LEFT | POINT | OBTUSE ANGLE |
| | RIGHT → LEFT | |
| | UPPER RIGHT → LOWER LEFT | |
| | LOWER RIGHT → UPPER LEFT | |
| | DOWN → UP | RIGHT ANGLE |
| | UP → DOWN | |
| | OTHERS | ACUTE ANGLE |
| LOWER RIGHT → UPPER LEFT | POINT | OBTUSE ANGLE |
| | LOWER RIGHT → UPPER LEFT | |
| | RIGHT → LEFT | |
| | DOWN → UP | |
| | UPPER RIGHT → LOWER LEFT | RIGHT ANGLE |
| | LOWER LEFT → UPPER RIGHT | |
| | OTHERS | ACUTE ANGLE |

FIG. 8
800

| TARGET VECTOR ID | NEXT VECTOR ID | ROTATION DIRECTION |
|---|---|---|
| DOWN → UP | LOWER LEFT → UPPER RIGHT | CLOCKWISE |
| | LEFT → RIGHT | |
| | UPPER LEFT → LOWER RIGHT | |
| | LOWER RIGHT → UPPER LEFT | COUNTERCLOCKWISE |
| | RIGHT → LEFT | |
| | UPPER RIGHT → LOWER LEFT | |
| | OTHERS | NONE |
| LOWER LEFT → UPPER RIGHT | LEFT → RIGHT | CLOCKWISE |
| | UPPER LEFT → LOWER RIGHT | |
| | UP → DOWN | |
| | DOWN → UP | COUNTERCLOCKWISE |
| | LOWER RIGHT → UPPER LEFT | |
| | RIGHT → LEFT | |
| | OTHERS | NONE |
| LEFT → RIGHT | UPPER LEFT → LOWER RIGHT | CLOCKWISE |
| | UP → DOWN | |
| | UPPER RIGHT → LOWER LEFT | |
| | LOWER LEFT → UPPER RIGHT | COUNTERCLOCKWISE |
| | DOWN → UP | |
| | LOWER RIGHT → UPPER LEFT | |
| | OTHERS | NONE |
| UPPER LEFT → LOWER RIGHT | UP → DOWN | CLOCKWISE |
| | UPPER RIGHT → LOWER LEFT | |
| | RIGHT → LEFT | |
| | LEFT → RIGHT | COUNTERCLOCKWISE |
| | LOWER LEFT → UPPER RIGHT | |
| | DOWN → UP | |
| | OTHERS | NONE |
| UP → DOWN | UPPER RIGHT → LOWER LEFT | CLOCKWISE |
| | RIGHT → LEFT | |
| | LOWER RIGHT → UPPER LEFT | |
| | UPPER LEFT → LOWER RIGHT | COUNTERCLOCKWISE |
| | LEFT → RIGHT | |
| | LOWER LEFT → UPPER RIGHT | |
| | OTHERS | NONE |
| UPPER RIGHT → LOWER LEFT | RIGHT → LEFT | CLOCKWISE |
| | LOWER RIGHT → UPPER LEFT | |
| | DOWN → UP | |
| | UP → DOWN | COUNTERCLOCKWISE |
| | UPPER LEFT → LOWER RIGHT | |
| | LEFT → RIGHT | |
| | OTHERS | NONE |
| RIGHT → LEFT | LOWER RIGHT → UPPER LEFT | CLOCKWISE |
| | DOWN → UP | |
| | LOWER LEFT → UPPER RIGHT | |
| | UPPER RIGHT → LOWER LEFT | COUNTERCLOCKWISE |
| | UP → DOWN | |
| | UPPER LEFT → LOWER RIGHT | |
| | OTHERS | NONE |
| LOWER RIGHT → UPPER LEFT | DOWN → UP | CLOCKWISE |
| | LOWER LEFT → UPPER RIGHT | |
| | LEFT → RIGHT | |
| | RIGHT → LEFT | COUNTERCLOCKWISE |
| | UPPER RIGHT → LOWER LEFT | |
| | UP → DOWN | |
| | OTHERS | NONE |

| REFERENCE STROKE | TARGET STROKE | POSITION ID |
|---|---|---|
| STROKE 3 | STROKE 0 | LEFT(=7) |
| STROKE 0 | STROKE 1 | UP(=1) |
| STROKE 1 | STROKE 2 | LEFT(=7) |
| STROKE 2 | STROKE 3 | RIGHT(=3) |

FIG. 16

| ID OF VECTOR 1 | ID OF VECTOR 2 | SIGN |
|---|---|---|
| DOWN → UP | UPPER LEFT → LOWER RIGHT | CRESCENDO |
| | UP → DOWN | |
| LOWER LEFT → UPPER RIGHT | UPPER LEFT → LOWER RIGHT | ACCENT |
| | UP → DOWN | |
| | UPPER RIGHT → LOWER LEFT | DECRESCENDO |
| | | ACCENT |
| | UPPER RIGHT → LOWER LEFT | DECRESCENDO |
| | LOWER RIGHT → UPPER LEFT | |
| LEFT → RIGHT | UPPER RIGHT → LOWER LEFT | DECRESCENDO |
| | RIGHT → LEFT | |
| | LOWER RIGHT → UPPER LEFT | |
| UPPER LEFT → LOWER RIGHT | UPPER RIGHT → LOWER LEFT | DECRESCENDO |
| | RIGHT → LEFT | |
| | LOWER RIGHT → UPPER LEFT | DECRESCENDO |
| | | BREATH |
| | DOWN → UP | BREATH |
| | LOWER LEFT → UPPER RIGHT | |
| UP → DOWN | LOWER RIGHT → UPPER LEFT | BREATH |
| | DOWN → UP | |
| | LOWER LEFT → UPPER RIGHT | |
| UPPER RIGHT → LOWER LEFT | RIGHT → LEFT | CRESCENDO |
| | LOWER RIGHT → UPPER LEFT | BREATH |
| | DOWN → UP | |
| | LOWER LEFT → UPPER RIGHT | CRESCENDO |
| | | BREATH |
| | LEFT → RIGHT | CRESCENDO |
| | UPPER LEFT → LOWER RIGHT | |
| RIGHT → LEFT | LOWER LEFT → UPPER RIGHT | CRESCENDO |
| | LEFT → RIGHT | |
| | UPPER LEFT → LOWER RIGHT | |
| LOWER RIGHT → UPPER LEFT | LOWER LEFT → UPPER RIGHT | CRESCENDO |
| | LEFT → RIGHT | |
| | UPPER LEFT → LOWER RIGHT | CRESCENDO |
| | | ACCENT |
| | UP → DOWN | ACCENT |
| | UPPER RIGHT → LOWER LEFT | |

| CIRCLE | ◯ | ELLIPSE | ⬭ | UPPER ARC LINE | ⌒ | LOWER ARC LINE | ⌣ |
|---|---|---|---|---|---|---|---|
| LEFT ARC LINE | ⊂ | RIGHT ARC LINE | ⊃ | S | s | G CLEF | 𝄞 |
| MULTIPLE CIRCLE | ◎ | — | — | — | — | — | — |

230

| Stroke 1 | Stroke 2 | Stroke 3 | Stroke 4 |
|---|---|---|---|
| OBLIQUE UPPER RIGHT | HORIZONTAL | VERTICAL | VERTICAL |
| HORIZONTAL | OBLIQUE UPPER RIGHT | VERTICAL | VERTICAL |
| OBLIQUE UPPER RIGHT | OBLIQUE UPPER RIGHT | VERTICAL | VERTICAL |
| HORIZONTAL | HORIZONTAL | VERTICAL | VERTICAL |

240

| 1→2 | DOWN | DOWN | LOWER RIGHT | LOWER RIGHT |
| 2→3 | UPPER LEFT | UP | UP | UPPER LEFT |
| 3→4 | RIGHT | RIGHT | RIGHT | RIGHT |

| VECTOR ID OF VECTOR n | VECTOR ID OF VECTOR n+1 | TEMPORARY STORAGE VECTOR ID | X-AXIS FLAG |
|---|---|---|---|
| DOWN → UP | LOWER LEFT → UPPER RIGHT | LOWER LEFT → UPPER RIGHT | FALSE |
| | LOWER RIGHT → UPPER LEFT | LOWER RIGHT → UPPER LEFT | FALSE |
| | OTHERS | NO DIRECTION | FALSE |
| LOWER LEFT → UPPER RIGHT | DOWN → UP | LOWER LEFT → UPPER RIGHT | FALSE |
| | LEFT → RIGHT | LOWER LEFT → UPPER RIGHT | TRUE |
| | OTHERS | NO DIRECTION | FALSE |
| LEFT → RIGHT | LOWER LEFT → UPPER RIGHT | LOWER LEFT → UPPER RIGHT | TRUE |
| | UPPER LEFT → LOWER RIGHT | UPPER LEFT → LOWER RIGHT | TRUE |
| | OTHERS | NO DIRECTION | FALSE |
| UPPER LEFT → LOWER RIGHT | LEFT → RIGHT | UPPER LEFT → LOWER RIGHT | TRUE |
| | UP → DOWN | UPPER LEFT → LOWER RIGHT | FALSE |
| | OTHERS | NO DIRECTION | FALSE |
| UP → DOWN | UPPER LEFT → LOWER RIGHT | UPPER LEFT → LOWER RIGHT | FALSE |
| | UPPER RIGHT → LOWER LEFT | UPPER RIGHT → LOWER LEFT | FALSE |
| | OTHERS | NO DIRECTION | FALSE |
| UPPER RIGHT → LOWER LEFT | UP → DOWN | UPPER RIGHT → LOWER LEFT | FALSE |
| | RIGHT → LEFT | UPPER RIGHT → LOWER LEFT | TRUE |
| | OTHERS | NO DIRECTION | FALSE |
| RIGHT → LEFT | UPPER RIGHT → LOWER LEFT | UPPER RIGHT → LOWER LEFT | TRUE |
| | LOWER RIGHT → UPPER LEFT | LOWER RIGHT → UPPER LEFT | TRUE |
| | OTHERS | NO DIRECTION | FALSE |
| LOWER RIGHT → UPPER LEFT | RIGHT → LEFT | LOWER RIGHT → UPPER LEFT | TRUE |
| | DOWN → UP | LOWER RIGHT → UPPER LEFT | FALSE |
| | OTHERS | NO DIRECTION | FALSE |

| X-AXIS FLAG | TEMPORARY STORAGE VECTOR ID | THRESHOLD UPPER LIMIT | THRESHOLD LOWER LIMIT |
|---|---|---|---|
| TRUE | LOWER RIGHT → UPPER LEFT | 34.1° | 19.1° |
| | UPPER LEFT → LOWER RIGHT | | |
| | UPPER RIGHT → LOWER LEFT | −19.1° | −34.1° |
| | LOWER LEFT → UPPER RIGHT | | |
| FALSE | LOWER RIGHT → UPPER LEFT | 78.4° | 48.4° |
| | UPPER LEFT → LOWER RIGHT | | |
| | UPPER RIGHT → LOWER LEFT | −48.4° | −78.4° |
| | LOWER LEFT → UPPER RIGHT | | |

HANDWRITTEN MUSIC SIGN RECOGNITION DEVICE AND PROGRAM

TECHNICAL FIELD

The present invention relates to a handwritten music sign recognition device and a program, and particularly relates to technology preferably used to recognize a sign inputted by handwriting by a user using an input means, such as a finger or a pen.

BACKGROUND ART

A tablet terminal corresponding to a handwriting input detects trace information resulted from scanning a touch panel with an input means, such as a finger or a pen, and recognizes a sign, a figure or the like based on the detected information.

Patent Literature 1 discloses a method as follows. A specific sign or figure for converting a character is registered in advance. When a character is inputted in a character box in which a handwritten character is inputted for performing character recognition, this character is converted into a target character based on the information registered in advance.

Further, Patent Literature 2 discloses a method to extract a line component from inputted coordinate data.

Moreover, Patent Literature 3 discloses a method as follows. The end point and the starting point of a writing stroke are linked with virtual lines, and a characteristic amount of a bent position generated in this case is detected. Then, the detected characteristic amount and dictionary data are compared to perform character recognition.

CITATION LIST

Patent Literature

Patent Literature 1: Japanese Laid-open Patent Publication No. 2000-194796
Patent Literature 2: Japanese Laid-open Patent Publication No. 1-96770
Patent Literature 3: Japanese Laid-open Patent Publication No. 2004-133951

SUMMARY OF INVENTION

Technical Problem

However, in the techniques described in Patent Literatures 1, 3, it is necessary to register in advance a specific sign or figure for converting a character. Accordingly, it is necessary to retain data by amounts of characters, signs, and figures which are recognizable. Therefore, a storage medium having a large storage capacity is needed.

Further, it is necessary that inputted characters and character candidates which are stored by large amounts in the storage medium are correlated one-to-one. Therefore, a complicated and large-scale program is needed.

Further, it is not possible to recognize a character or sign which is not registered in the storage medium. Moreover, precise sign recognition is not performed unless it is inputted clearly.

Further, in the technique described in Patent Literature 2, when a plurality of inputted coordinate data are in a predetermined range, the plurality of coordinate data are taken as line data linking coordinates of a starting point and coordinates of an end point. When the inputted coordinate data are determined as being out of the predetermined range, coordinates of an end point of coordinate data preceding the coordinate data and coordinates of a first starting point of coordinate data within the predetermined range are extracted and stored as a line component. While recognition of such a line component is performed sequentially, line data are generated. Accordingly, the amount of calculations needed for recognizing the entirety of an inputted sign becomes large.

The present invention has been made in view of the above-described problems, and it is an object thereof to enable easy and accurate recognition of a sign inputted by handwriting by a user with an input means, such as a hand or a pen.

Solution to Problem

A handwritten music sign recognition device according to the present invention has: a touch information obtaining means which obtains, as position information, a position of an input means on a screen every time the input means moves, from when the input means touches the screen until when the input means is moved away therefrom; a vector information creation means which creates attributes of a vector indicating a trace of movement of the input means as vector information based on the position information obtained by the touch information obtaining means; a stroke information storage means which stores one or a plurality of pieces of stroke information for each object to be recognized, the stroke information including the vector information with respect to a series of one or a plurality of the vectors created by the vector information creation means based on the position information from when the input means touches the screen until when the input means is moved away therefrom; and a stroke characteristic amount derivation means which derives a characteristic amount of a stroke being a trace of movement of the input means from when the input means touches the screen until when the input means is moved away therefrom, based on the vector information included in the stroke information.

A program according to the present invention causes a computer to execute: a touch information obtaining step which obtains, as position information, a position of an input step on a screen every time the input step moves, from when the input step touches the screen until when the input step is moved away therefrom; a vector information creation step which creates attributes of a vector indicating a trace of movement of the input step as vector information based on the position information obtained by the touch information obtaining step; a stroke information storage step which stores one or a plurality of pieces of stroke information for each object to be recognized, the stroke information including the vector information with respect to a series of one or a plurality of the vectors created by the vector information creation step based on the position information from when the input step touches the screen until when the input step is moved away therefrom; and a stroke characteristic amount derivation step which derives a characteristic amount of a stroke being a trace of movement of the input step from when the input step touches the screen until when the input step is moved away therefrom, based on the vector information included in the stroke information.

Advantageous Effects of Invention

According to the present invention, a sign inputted by handwriting by a user with an input means, such as a hand or a pen, can be recognized easily and accurately.

BRIEF DESCRIPTION OF DRAWINGS

FIG. 5 is a diagram illustrating an example of starting point coordinates/end point coordinates/vector IDs of respective vectors, and characteristic amounts of strokes of a segno mark.

FIG. 7 is a diagram illustrating an example of the relation between vector IDs and connection types.

FIG. 8 is a diagram illustrating an example of the relation between vector IDs and connection types.

FIG. 16 is a diagram illustrating an example of the relation of two vector IDs and signs.

FIG. 34 is a diagram illustrating an example of the relation of vector IDs of two adjacent vectors, a temporary storage vector ID, and an X-axis flag.

FIG. 35 is a diagram illustrating an example of the relation of the X-axis flag, the temporary storage vector ID, a threshold upper limit, and a threshold lower limit.

DESCRIPTION OF EMBODIMENTS

Hereinafter, an embodiment of a handwritten music sign recognition device of the present invention will be explained with reference to the drawings.

First Embodiment

To begin with, a first embodiment will be explained.

Figure 1:
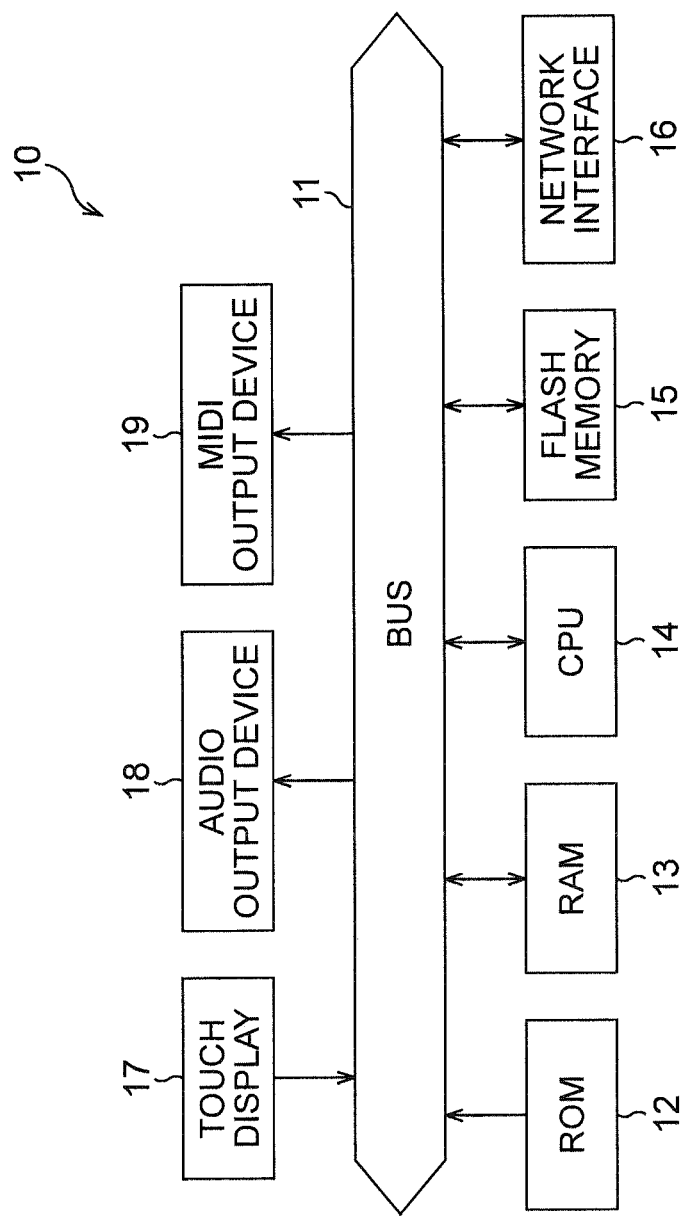
FIG. 1 is a block diagram illustrating an example of a schematic configuration of hardware of a handwritten music sign recognition device.
Figure 2:
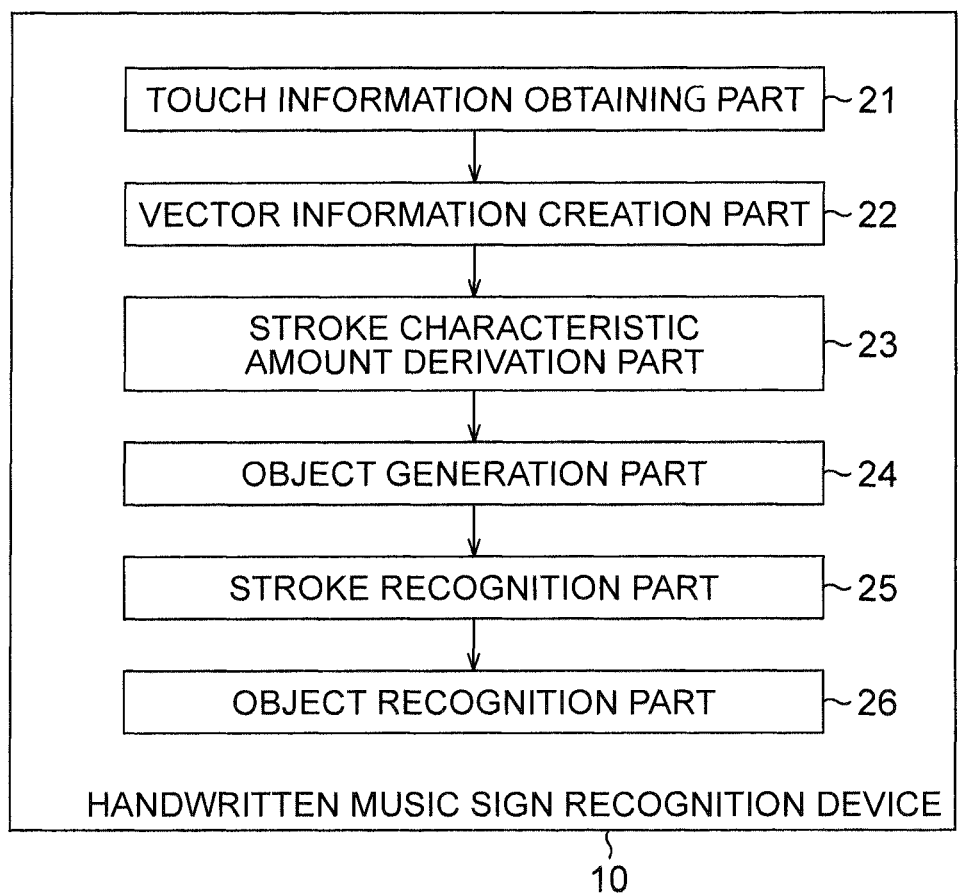
FIG. 2 is a block diagram illustrating an example of a functional schematic configuration of the handwritten music sign recognition device.

FIG. 1 is a block diagram illustrating an example of a schematic configuration of hardware of a handwritten music sign recognition device 10. FIG. 2 is a block diagram illustrating an example of a functional schematic configuration of the handwritten music sign recognition device 10.

The handwritten music sign recognition device 10 is constituted of a tablet terminal for example. Note that the handwritten music sign recognition device 10 is not limited to the tablet terminal as long as it is a terminal device having a touch panel. The handwritten music sign recognition device 10 may be constituted of, for example, a PC (Personal Computer) which can use a touch panel as a user interface.

In FIG. 1, 11 denotes a bus, 12 denotes a ROM, 13 denotes a RAM, 14 denotes a CPU, 15 denotes a flash memory, 16 denotes a network interface, 17 denotes a touch display, 18 denotes an audio output device, and 19 denotes a MIDI output device.

A program which controls the overall operation of the handwritten music sign recognition device 10 is stored in the flash memory 15 or the ROM 12. The CPU 14 reads this program and deploys the program in the RAM 13 to execute it. Thus, operation of the handwritten music sign recognition device 10 is realized.

The touch display 17 is a computer display having a touch panel. The user performs a handwriting input by using an input means, such as a finger or a pen, on the touch display 17. The handwritten music sign recognition device 10 recognizes the handwritten-inputted object (sign).

The network interface 16 is for storing information of recognized objects (signs) as a file in another piece of hardware, or reading a file of information of stored signs.

The audio output device 18 is for creating music performance information from recognized objects (signs) to enable audio output.

The MIDI output device 19 creates the MIDI information from recognized objects (signs) to enable MIDI output.

As illustrated in FIG. 2, the handwritten music sign recognition device 10 has a touch information obtaining part 21, a vector information creation part 22, a stroke characteristic amount derivation part 23, an object generation part 24, a stroke recognition part 25, and an object recognition part 26.

The touch information obtaining part 21 is realized by using, for example, the touch display 17, the RAM 13, the CPU 14, and the flash memory 15, and the like. Further, the touch information obtaining part 21 has an API (Application Programming Interface) which obtains position information every time a movement of the input means, such as a finger or a pen, is made.

The vector information creation part 22, the stroke characteristic amount derivation part 23, the object generation part 24, the stroke recognition part 25, and the object recognition part 26 are realized by using, for example, the RAM 13, the CPU 14, and the flash memory 15, and the like.

<Explanation of Vector, Stroke, and Object>

The relation of vectors, a stroke, and an object will be explained by taking an example of a segno mark with reference to FIG. 3.

An object 30 of a segno mark is constituted of an S-shaped stroke 31 (stroke 0), a line stroke 32 (stroke 1), and two point strokes 33, 34 (strokes 2, 3). The line stroke 32, the point stroke 33, and the point stroke 34 are each constituted of one vector.

(Method of Assigning a Vector ID)

In this embodiment, for simplification of processing, the vector information creation part 22 categorizes a vector under any one of following nine types ("down→up", "up→down", "lower left→upper right", "upper right→lower left", "left→right", "right→left", "upper left→lower right", "lower right→upper left", "point").

Figure 4:
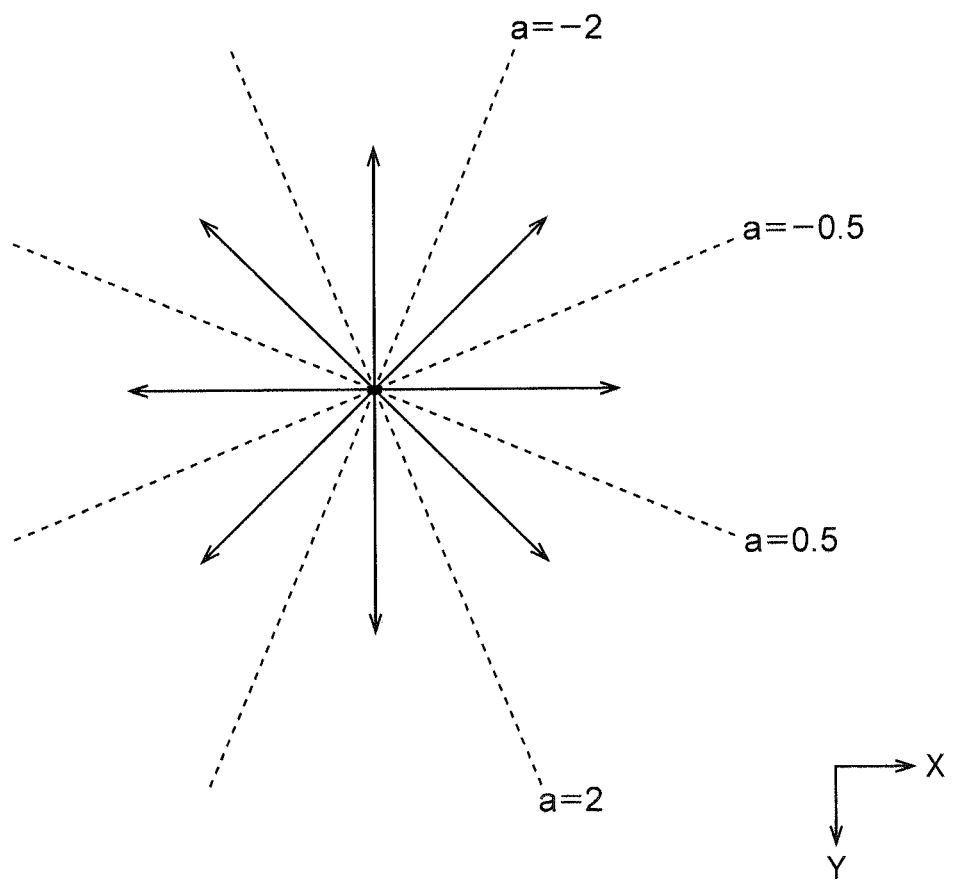
FIG. 4 is a diagram explaining an example of a method of categorizing vectors.

As illustrated in FIG. 4, the vector information creation part 22 obtains, from a starting point (x1, y1) and an end point (x2, y2) of a vector, an inclination a of the line linking this starting point and this end point from expression (1) below.

Then, the vector information creation part 22 determines a vector ID taking into consideration the positional relation of coordinates x1, y1, x2, y2. Note that in FIG. 4, the lower side of the Y-axis is "+". The right side of the X-axis is "+".

[Expression 1]

$$a = \frac{y_2 - y_1}{x_2 - x_1} (x_1 \neq x_2) \quad (1)$$

The vector information creation part 22 categorizes vectors according to (A) to (K) below.

(A) When a vector is $|a|>2$ and the relation between Y-coordinate y2 of end point and Y-coordinate y1 of starting point of the vector is y2<y1, the vector information creation part 22 defines vector ID of this vector as "down→up".

(B) When the inclination a of a vector is $|a|>2$ and the relation between Y-coordinate y2 of end point and Y-coordinate y1 of starting point of the vector is y2>y1, the vector information creation part 22 defines vector ID of this vector as "up→down".

(C) When the inclination a of a vector is $-2 \leq a < -0.5$ and the relation between X-coordinate x2 of end point and X-coordinate x1 of starting point of the vector is x2<x1, the vector information creation part 22 defines vector ID of this vector as "upper right→lower left".

(D) When the inclination a of a vector is $-2 \leq a < -0.5$ and the relation between X-coordinate x2 of end point and X-coordinate x1 of starting point of the vector is x2>x1, the vector information creation part 22 defines vector ID of this vector as "lower left→upper right".

(E) When the inclination a of a vector is $|a| \leq 0.5$ and the relation between X-coordinate x2 of end point and X-coordinate x1 of starting point of the vector is x2>x1, the vector information creation part 22 defines vector ID of this vector as "left→right".

(F) When the inclination a of a vector is $|a| \leq 0.5$ and the relation between X-coordinate x2 of end point and X-coordinate x1 of starting point of the vector is x2<x1, the vector information creation part 22 defines vector ID of this vector as "right left".

(G) When the inclination a of a vector is $0.5 < a \leq 2$ and the relation between X-coordinate x2 of end point and X-coordinate x1 of starting point of the vector is x2>x1, the vector information creation part 22 defines vector ID of this vector as "upper left→lower right".

(H) When the inclination a of a vector is $0.5 < a \leq 2$ and the relation between X-coordinate x2 of end point and X-coordinate x1 of starting point of the vector is x2<x1, the vector information creation part 22 defines vector ID of this vector as "lower right→upper left".

(I) When the relation between X-coordinate x2 of end point and X-coordinate x1 of starting point of a vector is x1=x2 and the relation between Y-coordinate y2 of end point and Y-coordinate y1 of starting point of the vector is y2<y1, the vector information creation part 22 defines vector ID of this vector as "down→up".

(J) When the relation between X-coordinate x2 of end point and X-coordinate x1 of starting point of a vector is x1=x2 and the relation between Y-coordinate y2 of end point and Y-coordinate y1 of starting point of the vector is y2>y1, the vector information creation part 22 defines vector ID of this vector as "up→down".

(K) When the relation between X-coordinate x2 of end point and X-coordinate x1 of starting point of a vector is x1=x2 and the relation between Y-coordinate y2 of end point and Y-coordinate y1 of starting point of the vector is y1=y2, the vector information creation part 22 defines vector ID of this vector as "point".

In the example illustrated in FIG. 3, for example, the vector ID of a vector whose vector Index (index) of the S-shaped stroke 31 is 0 is "down→up" as follows.

Figure 3:
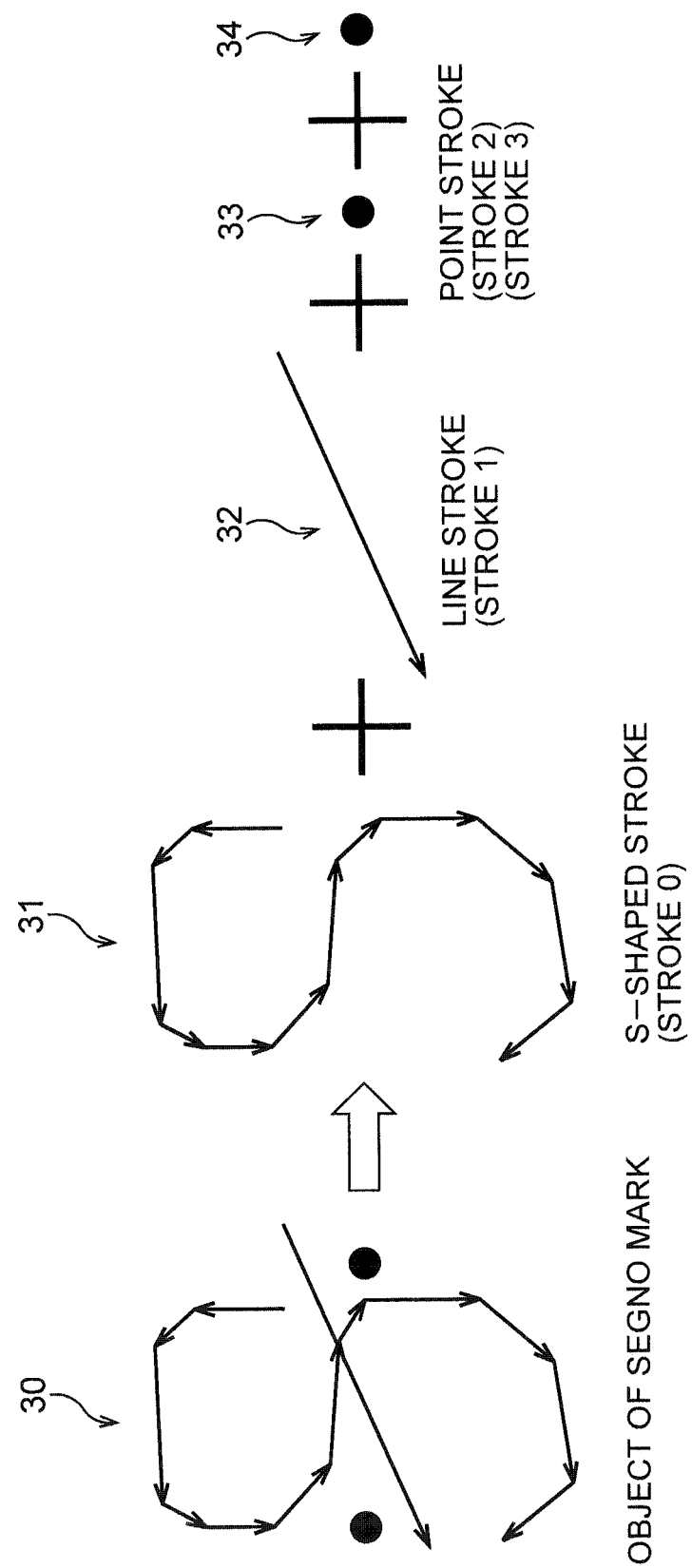
FIG. 3 is a diagram explaining an example of the relation of vectors, a stroke, and an object.

FIG. 5 is a diagram illustrating an example of starting point coordinates/end point coordinates/vector IDs of respective vectors, and characteristic amounts of strokes of the segno mark of FIG. 3.

First, from the starting point coordinate and the end point coordinate in FIG. 5, the inclination a is 16 (=(352−400)/(421−424)) (|a|>2). Further, Y-coordinate y2 of the end point is smaller than Y-coordinate y1 of the starting point (y2<y1).

Therefore, the vector whose vector Index (index) of the S-shaped stroke 31 (stroke 0) is 0 corresponds to the above (A). Thus, the vector ID of this vector is "down→up".

Note that in FIG. 5, for the convenience of description, the vector ID of "down→up" is denoted by "1". Further, in FIG. 5, the vector Index is an index whose initial value is "0", and the index is incremented every time a vector is obtained.

<Explanation of Each Characteristic Amount of a Stroke>

As described above, FIG. 5 illustrates characteristic amounts of strokes 31 to 34 in the segno mark of FIG. 3 as an example of characteristic amounts of strokes.

(Starting Point-End Point Distance)

When the starting point-end point distance is smaller than a prescribed value in a stroke, the stroke is considered as a closed figure like a circle. On the other hand, when the starting point-end point distance is larger than the prescribed value in the stroke, the stroke is considered as a figure which is not closed like an arc line.

The coordinates of starting point of the headmost vector of a stroke are (x1, y1), and the coordinates of end point of the final vector of this stroke are (x2, y2). The stroke characteristic amount derivation part 23 obtains a starting point-end point distance $D_{se}$ with expression (2) below. The starting point-end point distance $D_{se}$ is a straight distance linking the starting point of the headmost vector of a stroke and the end point of the final vector of this stroke.

[Expression 2]

$$D_{se} = \sqrt{(x_2-x_1)^2 + (y_2-y_1)^2} \quad (2)$$

(Coordinates of Four Points of an Inscribed Rectangle and Center Coordinates of a Stroke)

Coordinates of four points and center coordinates of an inscribed rectangle of a stroke are used for obtaining the positional relation of strokes with each other in a plurality of strokes. The inscribed rectangle of a stroke is a rectangle inscribed on the stroke. The coordinates of four points of the inscribed rectangle of a stroke are coordinates of four corners of the inscribed rectangle of the stroke.

Figure 6:
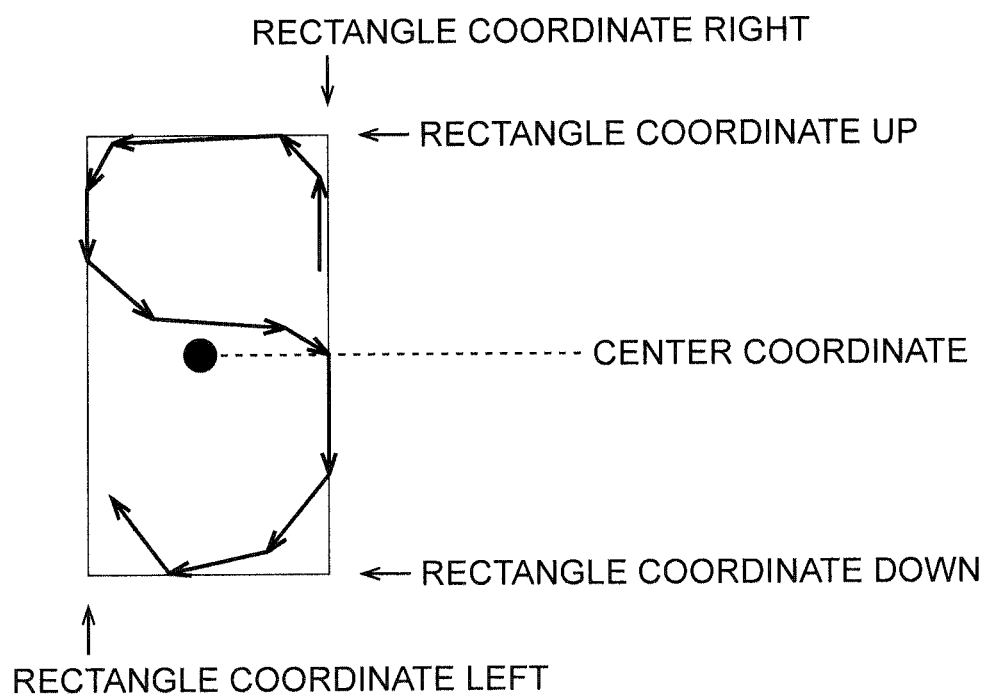
FIG. 6 is a diagram illustrating an example of an inscribed rectangle of an S-shaped stroke and center coordinates of this inscribed rectangle.

FIG. 6 illustrates an example of the inscribed rectangle of the S-shaped stroke 31 and the center coordinates of this inscribed rectangle.

A rectangle coordinate left is the leftmost X-coordinate among starting points or end points of all the vectors constituting the S-shaped stroke 31 (see the field left of the inscribed rectangle coordinates of FIG. 5).

A rectangle coordinate right is the rightmost X-coordinate among starting points or end points of all the vectors constituting the S-shaped stroke 31 (see the field right of the inscribed rectangle coordinates of FIG. 5).

A rectangle coordinate up is the highest Y-coordinate among starting points or end points of all the vectors constituting the S-shaped stroke 31 (see the field up of the inscribed rectangle coordinates of FIG. 5).

A rectangle coordinate down is the lowest Y-coordinate among starting points or end points of all the vectors constituting the S-shaped stroke 31 (see the field down of the inscribed rectangle coordinates of FIG. 5).

Center coordinates are expressed with an intermediate X-coordinate between the rectangle coordinate left and the rectangle coordinate right and an intermediate Y-coordinate between the rectangle coordinate up and the rectangle coordinate down (see the fields of center X and center Y of the inscribed rectangle coordinates of FIG. 5).

(Connection Type)

A connection type is used for determining whether a sign is smooth, whether a sign has a corner, or the like.

FIG. 7 is a diagram illustrating an example of the relation between vector IDs and connection types.

The stroke characteristic amount derivation part 23 determines the connection type of a vector whose connection type is to be determined based on the vector ID of the vector whose connection type is to be determined (target vector ID), the vector ID of a next vector of the target vector (next vector ID), and the relation 700 illustrated in FIG. 7. The relation 700 illustrated in FIG. 7 is registered in advance as, for example, a table in the handwritten music sign recognition device 10.

In this embodiment, as the connection type, one of obtuse angle (=1), right angle (=2), acute angle (=3), and none of these (=0) is determined as the connection type of each vector.

In the S-shaped stroke 31 (stroke 0) of the segno mark of FIG. 3, as illustrated in FIG. 5, the vector ID of the first vector is 1 (down→up), and the vector ID of the next vector thereof is 8 (lower right→upper left). Thus, from FIG. 7, the connection type of the first vector of the S-shaped stroke 31 (stroke 0) is 1 (obtuse angle). Note that the first vector is a vector whose vector Index is 0, and the next vector is a vector whose vector Index is 1.

(Rotation Direction)

A point where the rotation direction of a stroke changes is a hint for identifying a sign.

For example, in the first stroke of "f", vectors are continuous smoothly like "S", and the starting point and the end point are separated. "S" has one point where its rotation direction changes. On the other hand, "f" does not have any point where its rotation direction changes. Thus, the stroke recognition part 25 can distinguish "S" and "f" by presence of a point where the rotation direction of a stroke changes.

FIG. 8 is a diagram illustrating an example of the relation between vector IDs and rotation directions.

The stroke characteristic amount derivation part 23 determines the rotation direction of a vector whose rotation direction is to be determined based on the vector ID of the vector whose rotation direction is to be determined (target vector ID), the vector ID of a next vector of the target vector (next vector ID), and the relation 800 illustrated in FIG. 8. The relation 800 illustrated in FIG. 8 is registered in advance as, for example, a table in the handwritten music sign recognition device 10.

In the S-shaped stroke 31 (stroke 0) of the segno mark of FIG. 3, as illustrated in FIG. 5, the vector ID of the first vector is 1 (down→up), and the vector ID of the next vector thereof is 8 (lower right→upper left). Thus, from FIG. 8, the rotation direction of the first vector of the S-shaped stroke 31 (stroke 0) is counterclockwise (=2). Note that in FIG. 5, for the convenience of description, the rotation direction being clockwise is denoted by "1", the rotation direction being counterclockwise is denoted by "2", and absence of rotation direction is denoted by "0".

(Rotation Angle)

Figure 9:
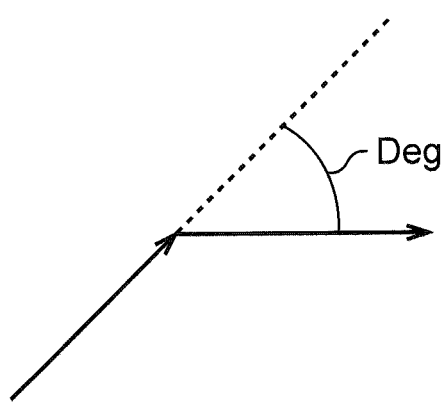
FIG. 9 is a diagram illustrating an example of a rotation angle.

FIG. 9 illustrates an example of rotation angle Deg from the vector whose rotation angle is to be determined to the next vector thereof. The handwritten music sign recognition device 10 can discriminate whether a sign is a circle or a multiple circle from an accumulation of this rotation angle.

The coordinates of starting point of the vector whose rotation angle is to be determined are (x11, y11), and the coordinates of end point are (x12, y12). Further, the coordinates of starting point of a next vector of the vector whose rotation angle is to be determined are (x21, y21), and the coordinates of end point are (x22, y22). In this case, the stroke characteristic amount derivation part 23 obtains the angle formed by the two vectors by expression (3) to expression (7) below as a rotation angle Deg (°) of the vector whose rotation angle is to be determined with respect to the next vector of the target vector.

[Expression 3]

$$x1 = x12 - x11, y1 = y12 - y11, x2 = x22 - x21, \quad (3)$$
$$y2 = y22 - y21$$

$$Nume = x_1 \times x_2 + y_1 \times y_2 \quad (4)$$

$$Deno_1 = \sqrt{x_1^2 + y_1^2} \quad (5)$$

$$Deno_2 = \sqrt{x_2^2 + y_2^2} \quad (6)$$

$$Deg = \cos^{-1}\frac{Nume}{Deno_1 \times Deno_2} \times 180 \div \pi \quad (7)$$

(Left-Right Movement Direction and Up-Down Movement Direction)

The stroke recognition part 25 determines whether a stroke is a sign like a line drawn simply from up to down or left to right by a left-right movement direction and an up-down movement direction.

Then, the stroke characteristic amount derivation part 23 obtains the left-right movement direction and the up-down movement direction from the vector ID.

When the vector ID is down→up (=1), there is no left-right movement direction (=0), and the up-down movement direction is up (=1). Further, when the vector ID is lower right→upper left (=8), the left-right movement direction is left (=1), and the up-down movement direction is up (=1). Note that for the convenience of description, in FIG. 5, the left-right movement direction being left is denoted by 1, the left-right movement direction being right is denoted by 2, and absence of left-right movement direction is denoted by 0. Further, the up-down movement direction being up is denoted by 1, the up-down movement direction being down is denoted by 2, and absence of up-down movement direction is denoted by 0.

(Indexes of Leftmost Point, Rightmost Point, Highest Point, Lowest Point)

For example, the leftmost point Index is 0 (starting point of the first vector constituting a stroke) and the rightmost point Index is N (starting point of the final vector constituting a stroke). In this case, the handwritten music sign recognition device 10 can determine it as a chevron sign with an open bottom if the highest point Index is near N/2.

In the example illustrated in FIG. 6, the leftmost point Index is 5, the rightmost point Index is 8, the highest point Index is 2, and the lowest point Index is 11 as illustrated in FIG. 5.

<Operation Flowchart>

Figure 10:
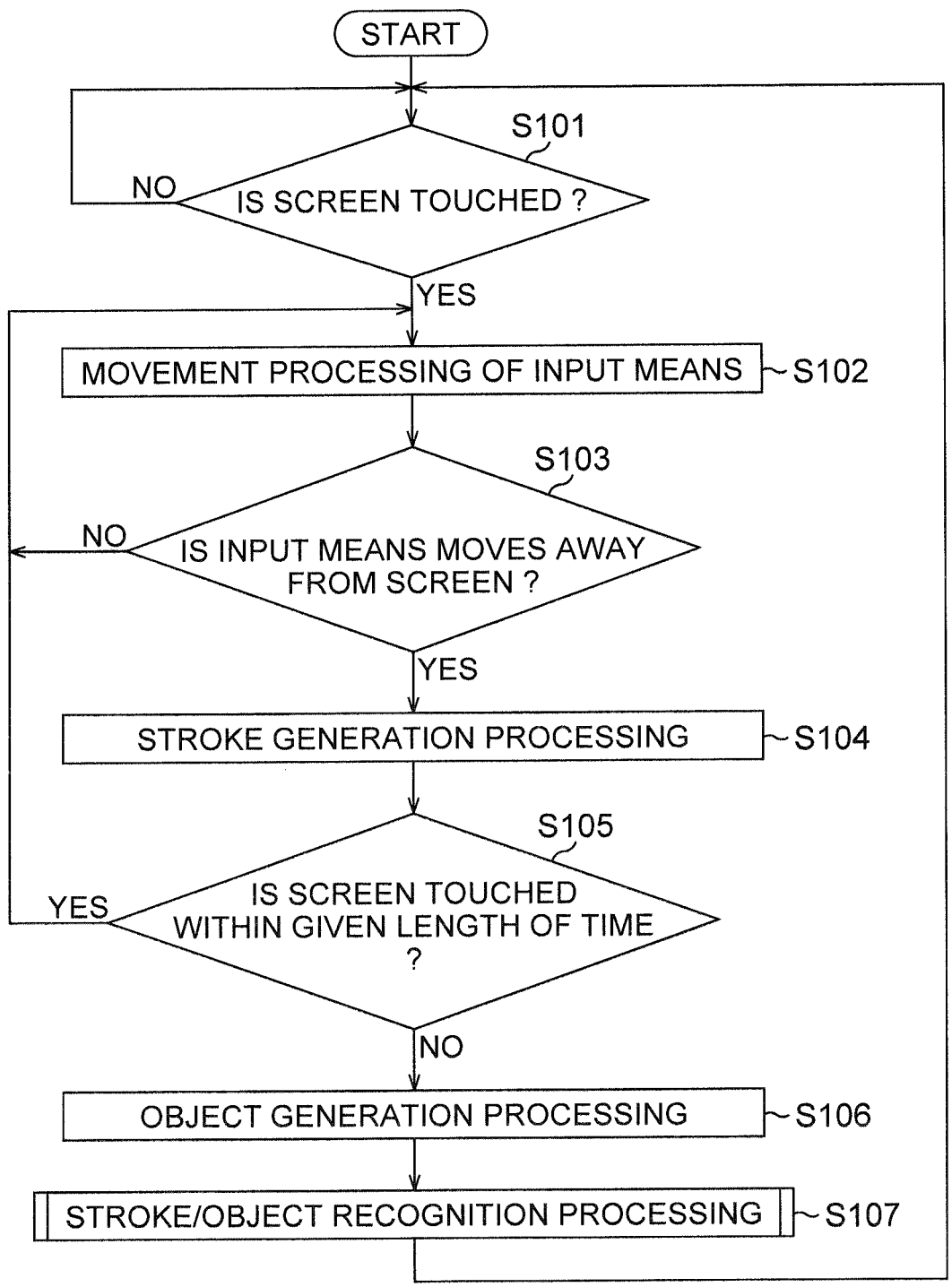
FIG. 10 is a flowchart for explaining an example of operation of handwritten music sign recognition device.

Next, an example of operation of the handwritten music sign recognition device 10 will be explained with reference to a flowchart of FIG. 10. FIG. 10 is a flowchart for explaining an example of a procedure of music sign recognition processing. The processing of this flowchart is realized by that, for example, the CPU 14 deploys a program stored in the flash memory 15 in the RAM 13 and executing the program.

In step S101, the touch information obtaining part 21 determines whether a screen of the touch display 17 is touched or not. When the screen is not touched as a result of this determination, it becomes a standby state. When the screen is touched, the process proceeds to step S102.

When it proceeded to step S102, the touch information obtaining part 21 empties a coordinate array, and then stores the touched coordinates in the coordinate array. After the screen is touched by the input means, until the input means moves away completely from the screen, movement processing of the input means is performed every time the input means is moved. This movement processing of the input means is performed by storing the coordinates of the moved input means in the coordinate array. Note that as described above the input means is, for example, a finger or a pen.

Next, in step S103, the touch information obtaining part 21 determines whether it is moved away from the touched screen or not. As a result of this determination, when the input means is not moved away from the screen, the process returns to step S102. Then, until the input means is moved away completely from the screen, the movement processing of the input means of step S102 is performed every time the input means moves. When the input means is moved away completely from the screen as a result of the determination in step S103, the process proceeds to step S104.

When it proceeded to step S104, the vector information creation part 22 and the stroke characteristic amount derivation part 23 execute stroke generation processing.

First, the vector information creation part 22 newly generates stroke information.

Next, the vector information creation part 22 creates coordinates of a vector with first coordinates being a starting point and second coordinates being an end point. At this time, the vector information creation part 22 sets the vector ID of the created vector. Further, the vector information creation part 22 derives the magnitude of the created vector. The vector information creation part 22 stores vector information indicating attributes of the created vector (coordinates, vector ID, magnitude) in a vector array of the stroke information.

Next, the vector information creation part 22 creates vector information of a vector with the second coordinates being a starting point and third coordinates being an end point, and stores it in the vector array of the stroke information.

Figure 11:
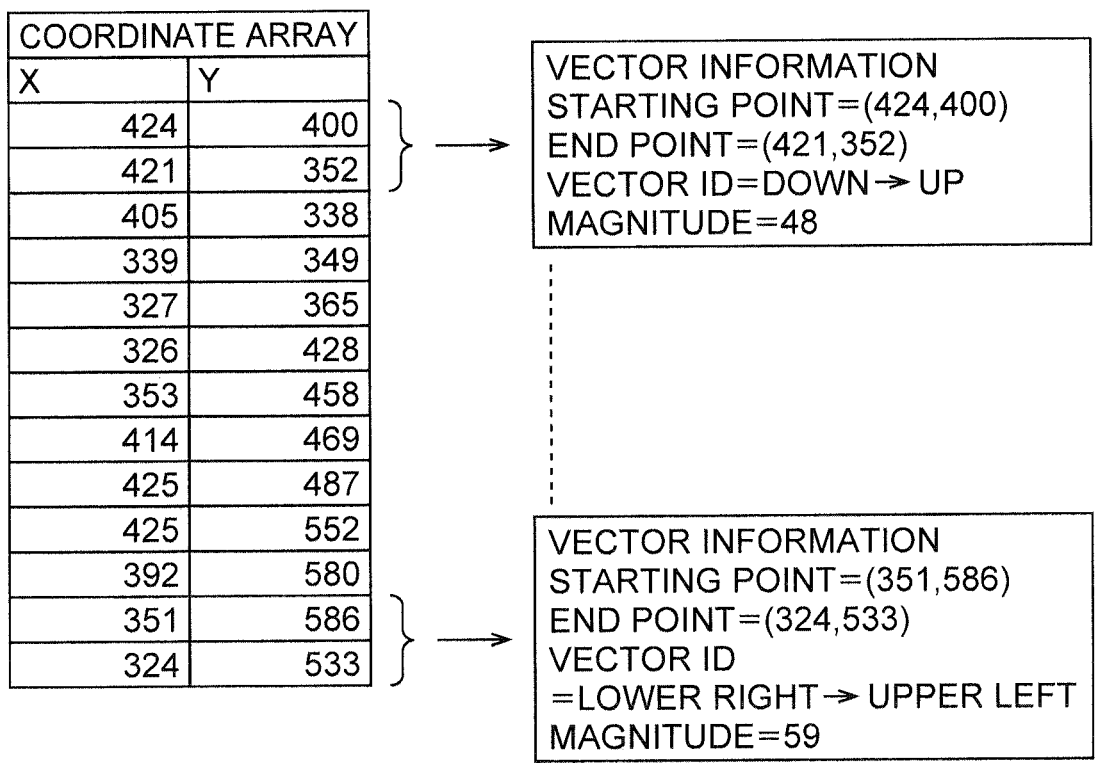
FIG. 11 is a diagram illustrating an example of vector information.

FIG. 11 is a diagram illustrating an example of vector information. FIG. 11 illustrates vector information of vectors constituting the S-shaped stroke 31 (stroke 0) of FIG. 3.

In the S-shaped stroke 31 (stroke 0) of FIG. 3, there are 13 starting points/end points of vectors, and thus 12 pieces of vector information are created. The vector information creation part 22 creates vector information from all of these coordinates, and stores it in the stroke information. Then, the stroke characteristic amount derivation part 23 derives the characteristic amounts of the stroke based on the vector information and stores them in the stroke information.

Next, in step S105, the vector information creation part 22 determines whether the screen of the touch display 17 is touched or not within a given length of time. As a result of this determination, when an input of a next stroke is started within the given length of time, the process returns to step S102. Then, the processing of step S102 to S104 is performed, so as to create the stroke information (vector information, characteristic amount) of the new stroke.

In the example illustrated in FIG. 3, first, after the input of the S-shaped stroke 31 (stroke 0), a line stroke 32 (stroke 1) is inputted within a given length of time. Further, a point stroke 33 (stroke 2) is inputted within a given length of time, and moreover, a point stroke 34 (stroke 3) is inputted within a given length of time. When such an input is performed, every time each stroke is inputted, the vector information creation part 22 and the stroke characteristic amount derivation part 23 generate stroke information of this stroke. When there is no input of a next stroke within a given length of time, the process proceeds to step S106.

When it proceeded to step S106, the object generation part 24 performs object generation processing to newly generate an object. The object generation part 24 stores stroke information (vector information, characteristic amounts) of the stroke which has been generated in the stroke array of the object.

At this time, information as illustrated in FIG. 5 is stored in the stroke information storage part as a table for example. Note that the information as illustrated in FIG. 5 is created for every object. Further, in FIG. 5, for the convenience of description, an illustration of information of the magnitudes of vectors is omitted. The magnitude of a vector is derived from the coordinates of starting point and the coordinates of end point of the vector. Thus, the magnitude of vectors need not be included in the vector information.

Moreover, the object generation part 24 obtains relative positional relation (position ID) of strokes. The position ID is an ID indicating the position of each stroke with respect to a stroke as a reference.

In this embodiment, the object generation part 24 uses nine types of position IDs below.

(L) When the positions of the stroke as a reference and the stroke for which a position ID is to be obtained are the same, the object generation part 24 defines the position ID of this stroke as "same (=0)".

(M) When the stroke as a reference is down and the stroke for which a position ID is to be obtained is up (down→up), the object generation part 24 defines the position ID of this stroke as "up (=1)".

(N) When the stroke as a reference is lower left and the stroke for which a position ID is to be obtained is upper right (lower left→upper right), the object generation part 24 defines the position ID of this stroke as "upper right (=2)".

(O) When the stroke as a reference is left and the stroke for which a position ID is to be obtained is right (left→right), the object generation part 24 defines the position ID of this stroke as "right (=3)".

(P) When the stroke as a reference is upper left and the stroke for which a position ID is to be obtained is lower right (upper left→lower right), the object generation part 24 defines the position ID of this stroke as "lower right (=4)".

(Q) When the stroke as a reference is up and the stroke for which a position ID is to be obtained is down (up→down), the object generation part 24 defines the position ID of this stroke as "down (=5)".

(R) When the stroke as a reference is upper right and the stroke for which a position ID is to be obtained is lower left (upper right→lower left), the object generation part 24 defines the position ID of this stroke as "lower left (=6)".

(S) When the stroke as a reference is right and the stroke for which a position ID is to be obtained is left (right→left), the object generation part 24 defines the position ID of this stroke as "left (=7)".

(T) When the stroke as a reference is lower right and the stroke for which a position ID is to be obtained is upper left (lower right→upper left), the object generation part 24 defines the position ID of this stroke as "upper left (=8)".

Here, an example of a method to obtain the position ID will be explained.

The object generation part 24 obtains a vector whose starting point is the center coordinates of an inscribed rectangle of the stroke as a reference and whose end point is the center coordinates of an inscribed rectangle of the stroke for which a position ID is to be obtained. Then, the object generation part 24 obtains the vector ID of this vector. For example, when the vector ID is "down→up", the position ID is "up (=1)", and when the vector ID is "left→right", the position ID is "right (=3)". Note that the vector ID is obtained in accordance with the above-described references (A) to (K).

In the example illustrated in FIG. 3, the object generation part 24 first obtains the position ID of the S-shaped stroke 31 (stroke 0). The S-shaped stroke 31 is the first stroke. Then, the object generation part 24 employs the last point stroke 34 (stroke 3) as the stroke as a reference. In this case, the object generation part 24 obtains a vector whose starting point is the center coordinates of an inscribed rectangle of the point stroke 34 as a reference and whose end point is the center coordinates of an inscribed rectangle of the S-shaped stroke 31 for which the position ID is to be obtained. The inclination a of this vector is 0.43 (=(426−449)/(375−478)) (see FIG. 5). Further, X-coordinate (=428) of the starting point is larger than X-coordinate (=375) of the end point. Thus, it falls under the above-described (F), and hence the vector ID is "right→left". Therefore, it falls under the above-described (S), and hence the position ID is "left (=7)".

Next, the object generation part 24 obtains the position ID of the line stroke 32 (stroke 1). In this case, the object recognition part 26 employs the S-shaped stroke 31 (stroke 0) as the stroke as a reference. The object generation part 24 obtains a vector whose starting point is the center coordinates of an inscribed rectangle of the S-shaped stroke 31 as a reference and whose end point is the center coordinates of an inscribed rectangle of the line stroke 32 for which the position ID is to be obtained. Then, the object generation part 24 obtains the vector ID of this vector.

In this case, X-coordinates of the starting point and the end point are the same (see FIG. 5). Further, Y-coordinate of the starting point is smaller than Y-coordinate of the end point (see FIG. 5). Thus, it falls under the above-described (I), and hence the vector ID is "up→down". Therefore, it falls under the above-described (M), and hence the position ID is "up (=1)".

Thereafter, when the position IDs of the point strokes 33, 34 (strokes 2, 3) are obtained similarly, four position IDs "left (=7)", "up (=1)", "left (=7)", "right (=3)" are obtained. Note that the position IDs of the point strokes 33, 34 (strokes 2, 3) are "left (=7)" and "right (=3)", respectively.

Figures 12, 13:
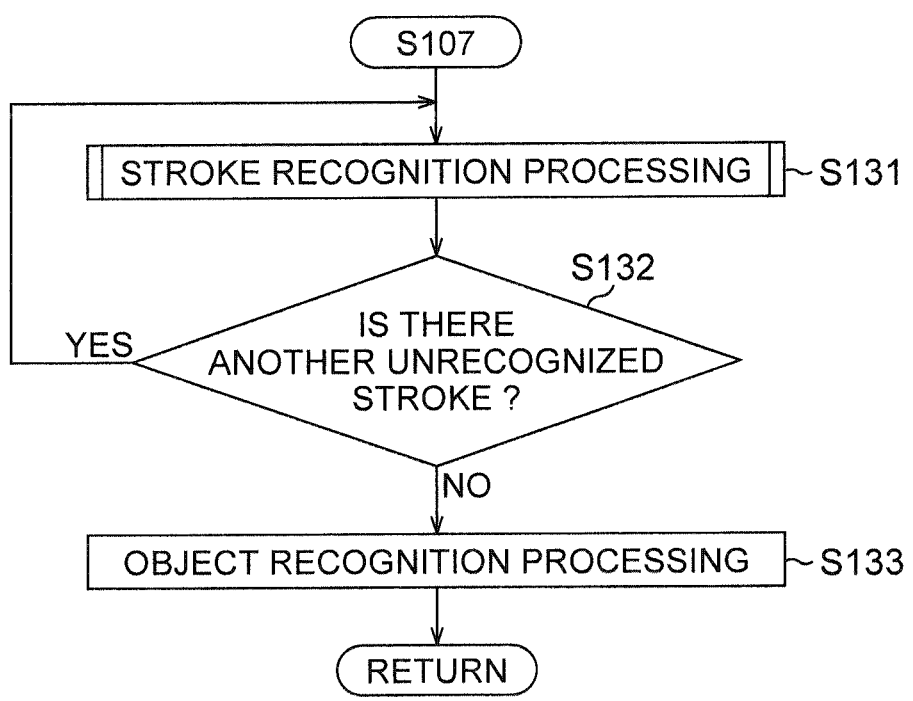
FIG. 12 is a diagram illustrating an example of a position ID array of a segno mark object.
FIG. 13 is a flowchart explaining an example of processing of step S107 of FIG. 10.

The object generation part 24 stores these position IDs in the position ID array of a segno mark object as illustrated in FIG. 12. Note that in FIG. 12, the stroke as a reference is described as reference stroke, and the stroke for which a position ID is to be obtained is described as a target stroke.

As described above, the object generation part 24 stores stroke information of a target stroke in the stroke array of each stroke of the object. Moreover, the object generation part 24 stores the position ID of the target stroke in the position ID array of each stroke of the object.

Returning to explanation of FIG. 10, in step S107, the stroke recognition part 25 and the object recognition part 26 perform stroke/object recognition processing. In the stroke/object recognition processing, after what sign the strokes constituting an object represent is recognized, what sign the object represents is recognized.

An example of the stroke/object recognition processing performed in step S107 of FIG. 10 will be explained with reference to a flowchart of FIG. 13.

In step S131, the stroke recognition part 25 performs stroke recognition processing to recognize a stroke. Details of the stroke recognition processing will be described later.

Next, in step S132, the stroke recognition part 25 determines whether there is any other unrecognized stroke or not. When there is an unrecognized stroke as a result of this determination, the process returns to step S131. Then, the stroke recognition part 25 performs the stroke recognition processing on the unrecognized stroke. On the other hand, when there is no unrecognized stroke, the process proceeds to step S133.

Next, in step S133, the object recognition part 26 performs object recognition processing to recognize an object. Details of the object recognition processing will be described later.

As illustrated in FIG. 13, after the stroke recognition part 25 recognizes strokes stored in an object, the object recognition part 26 recognizes the object.

An example of the stroke recognition processing performed in step S131 of FIG. 13 will be explained with reference to a flowchart of FIG. 14.

In step S141, the stroke recognition part 25 performs branching of processing according to the number of vectors contained in a stroke to be recognized. When the stroke to be recognized is a stroke constituted of one vector, the process proceeds to step S142. When the stroke to be recognized is a stroke constituted of two vectors, the process proceeds to step S143. When the stroke to be recognized is any other stroke, the process proceeds to step S144.

When it proceeded to step S142, the stroke recognition part 25 performs recognition processing of the stroke constituted of one vector. By the vector ID contained in stroke information of the stroke constituted of one vector for example, the stroke recognition part 25 recognizes what figure this stroke is from among a vertical line, a horizontal line, a rightward obliquely ascending line, a leftward obliquely ascending line, and a point. For example, when the vector ID contained in the stroke information of this stroke is "lower right upper left" or "upper left lower right", this stroke is the leftward obliquely ascending line.

Figure 15:
FIG. 15 is a diagram illustrating four signs constituted of two vectors.

When it proceeded to step S143, the stroke recognition part 25 performs recognition processing of the stroke constituted of two vectors. In this embodiment, recognizing four signs illustrated in FIG. 15 will be explained as an example.

FIG. 16 illustrates an example of the relation of two vector IDs contained in the stroke information of the stroke constituted of two vectors and signs. In FIG. 16, those presented in the field of ID of vector 1 and the field of ID of vector 2 are vector IDs of two vectors constituting one stroke. Those presented in the field of signs corresponding to the field of ID of vector 1 and the field of ID of vector 2 are signs of strokes corresponding to the vector IDs of the two vectors.

A relation 1600 illustrated in FIG. 16 is registered in the handwritten music sign recognition device 10 in advance as, for example, a table. When the combination of two vector IDs is other than combinations illustrated in FIG. 16, the stroke recognition part 25 determines that there is no sign corresponding to this stroke.

In the example illustrated in FIG. 16, as when the ID of the vector 1 is "lower left→upper right" and the ID of the vector 2 is "upper right→lower left", two signs may appear as candidates for the sign of the stroke. In this case, the stroke recognition part 25 determines whether the inscribed rectangle of the stroke is vertically long or horizontally long. When the inscribed rectangle of the stroke is vertically long as a result of this determination, the stroke recognition part 25 recognizes that this stroke as a breath or accent (see FIG. 15). On the other hand, when the inscribed rectangle of the stroke is horizontally long, the stroke recognition part 25 recognizes this stroke as a crescendo or decrescendo (see FIG. 15). Note that in FIG. 15, the center coordinates C of the inscribed rectangle of each stroke (sign) are illustrated together with each stroke (sign).

Figure 14:
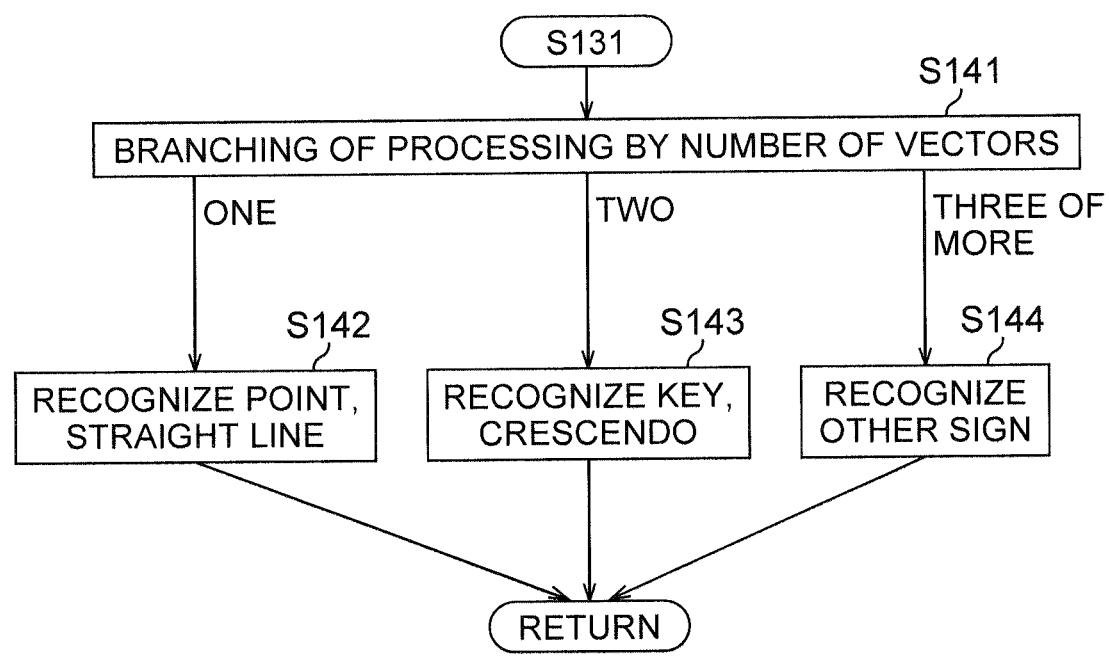
FIG. 14 is a flowchart explaining an example of processing of step S131 of FIG. 13.

Returning to the explanation of FIG. 14, when it proceeded to step S144, the stroke recognition part 25 performs the processing of recognizing any other stroke (when the stroke is constituted of three or more vectors).

Here, the processing of recognizing signs illustrated in FIG. 17 will be explained with reference to a flowchart of FIG. 18. The flowchart of FIG. 18 is a flowchart explaining an example of processing performed in step S144.

In step S181, the stroke recognition part 25 refers to a rotation direction among the characteristic amounts of a stroke to be recognized, counts the number of changes of the rotation direction, and performs branching of processing according to the number thereof. When the number of changes of the rotation direction of the stroke to be recognized is 0, the process proceeds to step S182. When the number of changes of the rotation direction of the stroke to be recognized is 1, the process proceeds to step S183. When the number of changes of the rotation direction of the stroke to be recognized is 2, the process proceeds to step S184. In this embodiment, when the number of changes of the rotation direction of the stroke to be recognized is other than 0, 1, and 2, the stroke recognition part 25 determines that there is no sign corresponding to this stroke.

<When the Number of Changes of Rotation Direction is 0>

In step S182, the stroke recognition part 25 performs a determination of other than "S" and "G clef" in the following procedure.

(1) The stroke recognition part 25 determines whether there is an acute angle point or not in the stroke to be recognized based on the connection type of this stroke (see FIG. 5 and FIG. 7). When there is an acute angle point in the stroke to be recognized as a result of this determination, the stroke recognition part 25 determines that there is no sign corresponding to this stroke.

(2) The stroke recognition part 25 obtains the total of rotation angles of the stroke to be recognized, and recognizes a sign based on the result thereof (see FIG. 5).

(2-1) When the Total of Rotation Angles is 180° or Less

When the total of rotation angles of the stroke to be recognized is 180° or less, the stroke recognition part 25 recognizes the sign of this stroke following conditions described in (2-1-1), (2-1-2), (2-1-3), (2-1-4), (2-1-5) below.

(2-1-1)

When there is "right (=2)" in the left-right movement direction of the stroke to be recognized and there is no "left (=1)", the stroke recognition part 25 recognizes the sign of the stroke to be recognized as in (2-1-1-1) and (2-1-1-2) below (see FIG. 5).

(2-1-1-1)

Figures 17, 18:
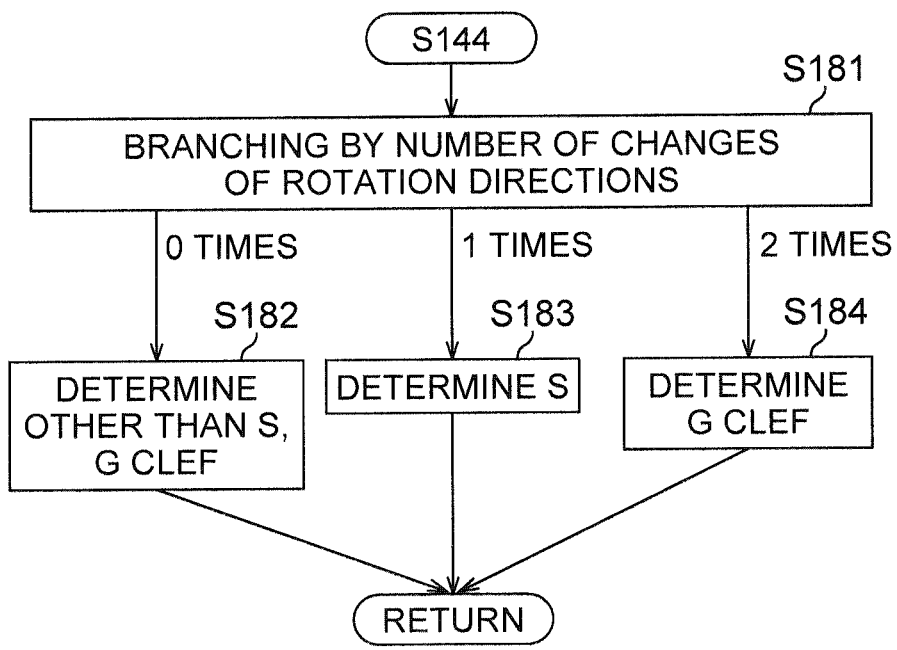
FIG. 17 is a diagram illustrating an example of signs to be recognized.
FIG. 18 is a flowchart explaining an example of processing of recognizing a sign by changes of a rotation direction.

Based on the highest point Index of the stroke to be recognized, when the highest point of the stroke is other than the starting point and the end point of this stroke, the stroke recognition part 25 recognizes that the sign of this stroke as an upper arc line (see FIG. 17).

(2-1-1-2)

Based on the highest point Index of the stroke to be recognized, when the highest point of the stroke is the starting point or the end point of this stroke, the stroke recognition part 25 recognizes that the sign of this stroke as a lower arc line (see FIG. 17).

(2-1-2)

When there is no "right (=2)" in the left-right movement direction of the stroke to be recognized and there is "left (=1)", the stroke recognition part 25 recognizes the sign of the stroke to be recognized as in (2-1-2-1) and (2-1-2-2) below (see FIG. 5).

(2-1-2-1)

Based on the highest point Index of the stroke to be recognized, when the highest point of the stroke is other than the starting point and the end point of this stroke, the stroke recognition part 25 recognizes that the sign of this stroke as an upper arc line (see FIG. 17).

(2-1-2-2)

Based on the highest point Index of the stroke to be recognized, when the highest point of the stroke is the starting point or the end point of this stroke, the stroke recognition part 25 recognizes that the sign of this stroke as a lower arc line (see FIG. 17).

(2-1-3)

When there is "down (=2)" in the up-down movement direction of the stroke to be recognized and there is no "up (=1)", the stroke recognition part 25 recognizes the sign of the stroke to be recognized as in (2-1-3-1) and (2-1-3-2) below (see FIG. 5).

(2-1-3-1)

Based on the leftmost point Index of the stroke to be recognized, when the leftmost point of the stroke is other than the starting point and the end point of this stroke, the stroke recognition part 25 recognizes that the sign of this stroke as a left arc line (see FIG. 17).

(2-1-3-2)

Based on the leftmost point Index of the stroke to be recognized, when the leftmost point of the stroke is the starting point or the end point of this stroke, the stroke recognition part 25 recognizes that the sign of this stroke as a right arc line (see FIG. 17).

(2-1-4)

When there is no "down (=2)" in the up-down movement direction of the stroke to be recognized and there is "up (=1)", the stroke recognition part 25 recognizes the sign of the stroke to be recognized as in (2-1-4-1) and (2-1-4-2) below (see FIG. 5).

(2-1-4-1)

Based on the leftmost point Index of the stroke to be recognized, when the leftmost point of the stroke is other than the starting point and the end point of this stroke, the stroke recognition part 25 recognizes that the sign of this stroke as a left arc line (see FIG. 17).

(2-1-4-2)

Based on the leftmost point Index of the stroke to be recognized, when the leftmost point of the stroke is the starting point or the end point of this stroke, the stroke recognition part 25 recognizes that the sign of this stroke as a right arc line (see FIG. 17).

(2-1-5)

When none of the (2-1-1), (2-1-2), (2-1-3), and (2-1-4) applies, the stroke recognition part 25 determines that there is no sign corresponding to the stroke to be recognized.

(2-2) When the Total of Rotation Angles Exceeds 360°

When the total of rotation angles of the stroke to be recognized exceeds 360°, the stroke recognition part 25 recognizes the sign of the stroke to be recognized as a multiple circle.

(2-3) When the Total of Rotation Angles is Neither 180° or Less Nor More than 360°

When the total of rotation angles of the stroke to be recognized is out of the ranges described in the (2-1) and the (2-2), the stroke recognition part 25 recognizes the sign of this stroke as a circle or an ellipse. Specifically, the stroke recognition part 25 recognizes whether the stroke to be recognized is the sign of a circle or an ellipse as follows.

Figure 19:
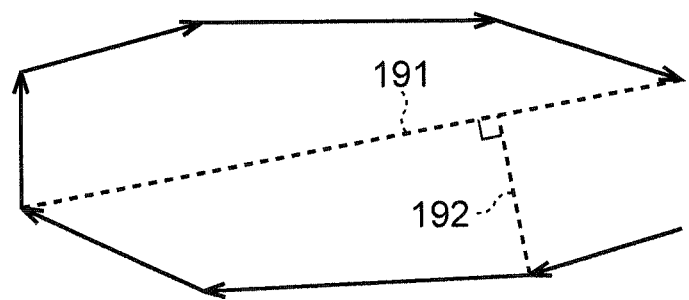
FIG. 19 is a diagram explaining an example of a method of recognizing which of a sign of circle and a sign of ellipse the stroke to be recognized is.

FIG. 19 is a diagram explaining an example of a method of recognizing which of a sign of circle and a sign of ellipse the stroke to be recognized is.

First, the stroke recognition part 25 obtains an equation of a line 191 linking the leftmost point and the rightmost point of the stroke to be recognized. Here, the length of the line 191 will be referred to as a major axis.

Next, the stroke recognition part 25 obtains a leg as a normal drawn from each point (starting point and end point of the vector) of the stroke to be recognized down to the line 191.

Next, among the lengths of the points of the stroke to be recognized and the legs of the normals thereof, the stroke recognition part 25 takes the longest one as a half minor axis of an ellipse. In FIG. 19, a line 192 which is the half minor axis of an ellipse is illustrated as an example.

Next, the stroke recognition part 25 obtains the ratio between the half minor axis×2 (=minor axis) and the major axis.

Next, when the obtained ratio is approximately 1:1, the stroke recognition part 25 recognizes that the sign of the stroke to be recognized is a circle. On the other hand, when the obtained ratio is not approximately 1:1, the stroke recognition part 25 recognizes that the sign of the stroke to be recognized is an ellipse.

<When the Number of Changes of Rotation Direction is 1>

In step S183, the stroke recognition part 25 determines whether the sign of the stroke to be recognized is "S" or not.

Figure 20:
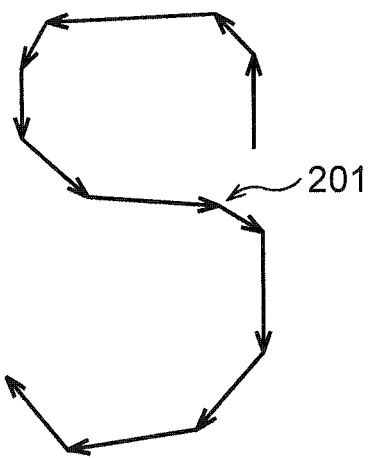
FIG. 20 is a diagram illustrating an example of a point where a rotation direction of "S" changes.

FIG. 20 is a diagram illustrating an example of a point 201 where the rotation direction of "S" changes.

First, the stroke recognition part 25 derives the number of vectors before or after the point 201 where the rotation direction of the stroke to be recognized changes. When the derived number of vectors is less than a number (three) by which an arc can be drawn, the stroke recognition part 25 determines that there is no sign corresponding to the stroke to be recognized.

In the example illustrated in FIG. 20, the number of vectors before the point 201 where the rotation direction of "S" changes is seven. On the other hand, the number of vectors after the point 201 where the rotation direction of "S" changes is five.

Therefore, the stroke recognition part 25 determines that the number of vectors before or after the point 201 where the rotation direction of "S" changes is a number by which an arc can be drawn.

Note that in the example illustrated in FIG. 20, the number of vectors is 12, which is more than or equal to three.

Further, the stroke recognition part 25 can determine whether it is a vector before the point 201 where the rotation direction of "S" changes or a vector after that based on, for example, the vector Index.

Next, when the absolute value of the total of rotation angles of vectors up to the point where the rotation direction of the stroke to be recognized changes and the absolute value of the total of rotation angles of vectors after the point are both 100° or more, the stroke recognition part 25 recognizes the sign of the stroke to be recognized as "S". On the other hand, when the absolute values are not 100° or more, the stroke recognition part 25 determines that the sign of the stroke to be recognized is not "S".

In the example illustrated in FIG. 20, the absolute value of the total of rotation angles of vectors up to the point 201 is 257°, and the absolute value of the total of rotation angles of vectors after the point 201 is 220°. Therefore, the stroke recognition part 25 can recognize the sign of the stroke to be recognized as "S".

<When the Number of Changes of Rotation Direction is 2>

In step S184, the stroke recognition part 25 determines whether the sign of the stroke to be recognized is a "G clef" or not.

Figure 21:
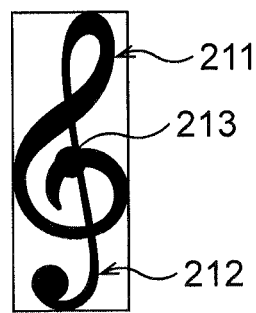
FIG. 21 is a diagram explaining an example of a method of determining whether a sign of a stroke to be recognized is a "G clef" or not.

FIG. 21 is a diagram explaining an example of a method of determining whether the sign of the stroke to be recognized is the "G clef" or not.

When all of three conditions (U), (V), (W) below are satisfied, the stroke recognition part 25 determines that the sign of the stroke to be recognized is the "G clef", or otherwise determines that the sign of the stroke to be recognized is not the "G clef".

(U) There exists one each of first point where the rotation direction of the stroke to be recognized changes from clockwise to counterclockwise and second point where it changes from counterclockwise to clockwise.

(V) First point where the rotation direction of the stroke to be recognized changes from clockwise to counterclockwise is located higher than the center of an inscribed rectangle of the stroke.

(W) Second point where the rotation direction of the stroke to be recognized changes from counterclockwise to clockwise is located lower than the center of an inscribed rectangle of the stroke.

In the example illustrated in FIG. 21, first point 211 and second point 212 exist one each. The first point 211 is located higher than the center 213 of the inscribed rectangle of the stroke. The second point 212 is located lower than the center 213 of the inscribed angle of the stroke. Therefore, the stroke recognition part 25 determines that the stroke illustrated in FIG. 21 is the "G clef".

Next, the object recognition processing performed in S133 of the flowchart of FIG. 13 will be explained.

In the following, the object to be recognized which is a segno mark will be explained as an example. In order for a sign drawn on the screen of the touch display 17 to be determined as a segno mark, it is necessary that condition 1, condition 2, and condition 3 below are satisfied.

Condition 1: the object is constituted of four strokes, "S", "rightward obliquely ascending line", "point", and "point".

Condition 2: the distance between the center of an inscribed rectangle of "S" and the center of an inscribed rectangle of "rightward obliquely ascending line" is less than or equal to a threshold (these centers are located closely).

Condition 3: there are "points" at left and right of the center of an inscribed rectangle of "S" or the center of an inscribed rectangle of "rightward obliquely ascending line".

In the example illustrated in FIG. 3, the position ID of the line stroke 32 (stroke 1) with respect to the S-shaped stroke 31 (stroke 0) is "up (=1)" (see FIG. 12). Therefore, with respect to the X-axis direction, the S-shaped stroke 31 (stroke 0) and the line stroke 32 (stroke 1) are at close positions.

Further, the Y-coordinate of the center of an inscribed rectangle of the S-shaped stroke 31 (stroke 0) and the Y-coordinate of the center of an inscribed rectangle of the line stroke 32 (stroke 1) is separated only by 20 (see FIG. 5). Therefore, it can be assumed that these centers are close (satisfying condition 2).

The position ID of the point stroke 33 (stroke 2) with respect to the line stroke 32 (stroke 1) is "left (=7)" (see FIG. 12). Further, the difference between the Y-coordinate of the center of the inscribed rectangle of the line stroke 32 (stroke 1) and the Y-coordinate of the center of an inscribed rectangle of the point stroke 34 (stroke 3) is three (see FIG. 5). Further, the X-coordinate of the center of the inscribed rectangle of the line stroke 32 (stroke 1) is smaller by 53 than the X-coordinate of the center of the inscribed rectangle of the point stroke 34 (stroke 3) (see FIG. 5). Therefore, the point stroke 34 (stroke 3) is located on the right of the line stroke 32 (stroke 1).

Thus, in the example illustrated in FIG. 3, since the conditions 1 to 3 are satisfied, the object recognition part 26 can recognize the object to be recognized as a segno mark.

In the stroke/object recognition processing, when there is an input of another stroke within a given length of time since the input of one stroke is finished, the stroke recognition part 25 and the object recognition part 26 wait until this input is completed. On the other hand, when there is no input of another stroke within the given length of time since the input of one stroke is finished, the stroke recognition part 25 performs processing of recognizing an unrecognized stroke and registering it in an object, and the object recognition part 26 performs processing of recognizing this object.

Figure 22:
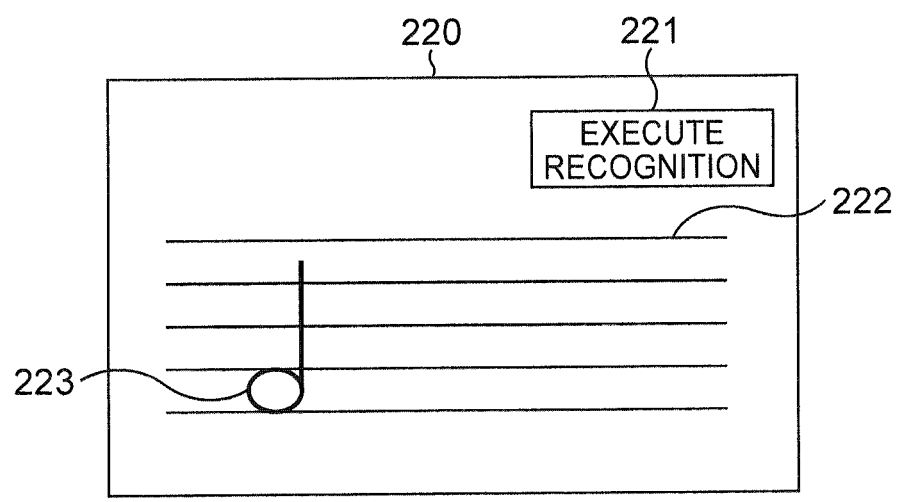
FIG. 22 is a diagram illustrating an example of a screen of a touch display.

Further, instead of doing in this manner, as illustrated in FIG. 22, the handwritten music sign recognition device 10 may display an execute recognition button 221 which can be operated by the user on the screen (touch panel 220) of the touch display 17 for allowing a recognition start instruction. In this case, the user operates the execute recognition button 221 after all strokes (ellipse and vertical line) are drawn by using the input means on the screen of the touch display 17. When the execute recognition button 221 is operated, the stroke recognition part 25 and the object recognition part 26 start the stroke/object recognition processing. The stroke recognition part 25 performs processing of recognizing an unrecognized stroke and registering it in an object, and the object recognition part 26 performs processing of recognizing this object.

The handwritten music sign recognition device 10 of this embodiment displays a staff 222 in advance on the screen of the touch display 17. When the object is recognized as a figure (for example a circle or an ellipse) corresponding to a note, the object recognition part 26 recognizes this object as the note. Then, the object recognition part 26 recognizes the pitch of this note based on the position of the recognized note on the staff 222.

In the example illustrated in FIG. 22, the ellipse part of the object is located between the first line and the second line.

Therefore, the object recognition part 26 recognizes that the object drawn on the screen of the touch display 17 is a half note 223 of the pitch "fa".

Next, an example of a method of recognizing a sharp sign "#" as an example of an object constituted of a plurality of strokes will be explained.

Figures 23A, 23B:
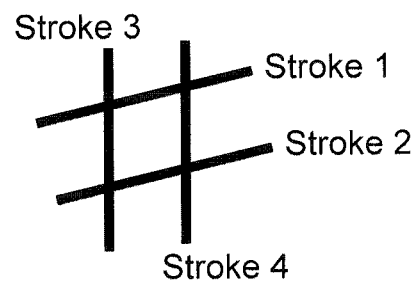
FIG. 23A is a diagram illustrating an example of strokes of a sharp sign.
FIG. 23B is a diagram illustrating an example of a database for the sharp sign.

FIG. 23A is a diagram illustrating an example of strokes of the sharp sign.

As illustrated in FIG. 23A, the sharp sign "#" is constituted of four strokes, Stroke 1, Stroke 2, Stroke 3, Stroke 4.

FIG. 23B is a diagram illustrating an example of a database 230 (dictionary data) for the sharp sign. The database 230 (dictionary data) for the sharp sign is registered in advance in the handwritten music sign recognition device 10.

A sign constituted of a plurality of strokes as illustrated in FIG. 23A has a database (dictionary data) as illustrated in FIG. 23B. Note that the dictionary data stores what sign one stroke represents. The dictionary data are not for storing actual coordinate data and vector information created based on the data.

The database 230 (dictionary data) for the sharp sign stores "oblique upper right", "horizontal", "oblique upper right", "horizontal" as Stroke 1.

The database 230 (dictionary data) for the sharp sign stores "horizontal", "oblique upper right", "oblique upper right", "horizontal" as Stroke 2.

The database 230 (dictionary data) for the sharp sign stores "vertical", "vertical", "vertical", "vertical" as Stroke 3 and Stroke 4.

Figures 24A, 24B:
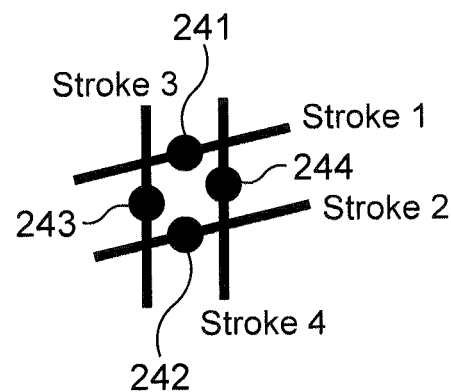
FIG. 24A is a diagram illustrating an example of barycenters of strokes constituting the sharp sign.
FIG. 24B is a diagram illustrating an example of a positional relation of the barycenters of the strokes constituting the sharp sign.

FIG. 24A is a diagram illustrating an example of barycenters 241, 242, 243, 244 of the strokes Stroke 1, Stroke 2, Stroke 3, Stroke 4 illustrated in FIG. 23A.

FIG. 24B is a diagram illustrating an example of a positional relation 240 of the barycenters 241, 242, 243, 244 of the strokes Stroke 1, Stroke 2, Stroke 3, Stroke 4 illustrated in FIG. 23A. The positional relation 240 illustrated in FIG. 24B is registered in advance in the handwritten music sign recognition device 10 as a table for example.

In FIG. 24B, "down", "down", "lower right", "lower right" are registered as directions of a vector whose starting point is the barycenter 241 of the stroke Stroke 1 and whose end point is the barycenter 242 of the stroke Stroke 2 (see the field of "1→2" of FIG. 24B).

"Upper left", "up", "up", "upper left" are registered as directions of a vector whose starting point is the barycenter 242 of the stroke Stroke 2 and whose end point is the barycenter 243 of the stroke Stroke 3 (see the field of "2→3" of FIG. 24B).

"Right", "right", "right", "right" are registered as directions of a vector whose starting point is the barycenter 243 of the stroke Stroke 3 and whose end point is the barycenter 244 of the stroke Stroke 4 (see the field of "3→4" of FIG. 24B).

The combination of four aligned horizontally in one row in FIG. 23B is a combination of signs of four strokes Stroke 1, Stroke 2, Stroke 3, Stroke 4 which can be taken as the sharp sign. Further, the combination of three aligned vertically in a column in FIG. 24B is a combination of barycenters of four strokes Stroke 1, Stroke 2, Stroke 3, Stroke 4 which can be taken as the sharp sign.

When the four strokes Stroke 1, Stroke 2, Stroke 3, Stroke 4 satisfy the relations of FIG. 23B and FIG. 24B, the object recognition part 26 recognizes that the sign constituted of these four strokes is the sharp sign.

A musical note other than the sharp sign and constituted of a plurality of strokes can be recognized by registering in advance the sign of each stroke as illustrated in FIG. 23B and the positional relation of barycenters of each stroke as illustrated in FIG. 24B.

As described above, in this embodiment, a music sign is recognized by evaluating characteristic points of vectors constituting the music sign. Therefore, it is possible to accurately recognize a handwritten-inputted music sign without retaining vast amounts of data.

In this embodiment, an example of recognizing a music sign is exemplified, but the handwritten music sign recognition device of the present invention is able to recognize characters, such as "Coda", and numerals.

Second Embodiment

Next, a second embodiment will be explained. In the first embodiment, the case that vectors obtained every time the input means is moved are used as they are in the touch information obtaining part 21 is explained as an example. On the other hand, in this embodiment, a combination processing of combining a plurality of vectors into one vector according to predetermined conditions is performed. Thus, the number of vectors can be compressed. In this manner, this embodiment and the first embodiment are different mainly in configuration and processing for performing the combination processing. Specifically, part of the processing in the vector information creation part 22 is mainly different. Therefore, in the explanation of this embodiment, same parts as those in the first embodiment are given the same reference numerals as those given in FIG. 1 to FIG. 24B, and detailed explanations thereof are omitted.

In this embodiment, four examples will be explained as the combination processing.

First Example

In this example, vector conversion processing of combining a plurality of minute vectors to convert them into a vector having a certain magnitude will be explained.

Figure 25:
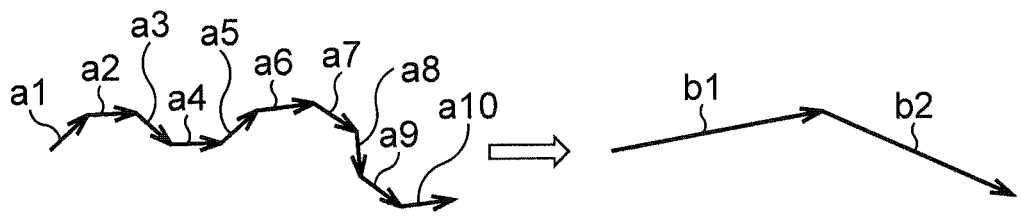
FIG. 25 is a diagram explaining a first example of a method of combining a plurality of minute vectors.

FIG. 25 is a diagram explaining a first example of a method of combining a plurality of minute vectors. In FIG. 25, combining ten minute vectors a1 to a10 to convert them into two vectors b1, b2 having certain magnitudes will be illustrated as an example.

In this example, there are first to third vector arrays as vector arrays of stroke information.

In the first vector array, vector information of minute vectors (coordinates, vector IDs, magnitudes) is stored. The first vector array is a vector array explained in a first embodiment.

In the second vector array, vector information of minute vectors to be converted is stored.

In the third vector array, vector information of vectors after conversion is stored.

Figure 26:
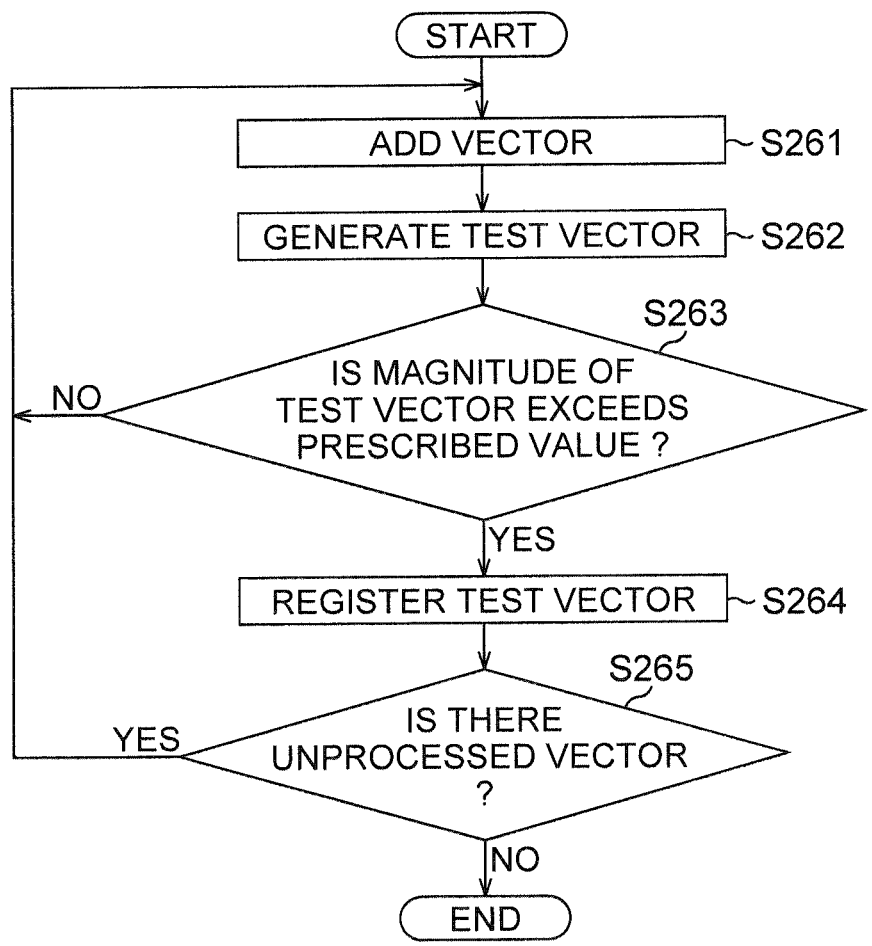
FIG. 26 is a flowchart explaining a first example of combination processing of combining a plurality of minute vectors.

With reference to a flowchart of FIG. 26, the first example of the combination processing of combining a plurality of minute vectors will be explained. The flowchart of FIG. 26 is executed when, for example, vector information of minute vectors is stored in the first vector array in step S104 of FIG. 10.

In step S261, the vector information creation part 22 selects one non-selected minute vector sequentially from the head minute vector of the first vector array. Then, the vector information creation part 22 copies (adds) vector information of the selected minute vector to the second vector array. At this time, the vector information creation part 22 copies (adds) the vector information of the selected minute vector to the head of empty parts of the second vector array.

Next, in step S262, the vector information creation part 22 generates a test vector whose starting point is the starting point of the first minute vector of the second vector array, and whose end point is the end point of the last minute vector of the second vector array. Then, the vector information creation part 22 obtains the magnitude of the created test vector.

Next, in step S263, the vector information creation part 22 determines whether the magnitude of the test vector exceeds a prescribed value or not. When the magnitude of the test vector exceeds the prescribed value as a result of this determination, the process proceeds to step S264. On the other hand, when the magnitude of the test vector is equal to or less than the prescribed value, the process returns to step S261. Then, in step S261, the vector information creation part 22 copies (adds) the vector information of the next minute vector from the first vector array to the second vector array.

Then, in step S262, the vector information creation part 22 generates a test vector whose starting point is the starting point of the first minute vector of the second vector array, and whose end point is the end point of the minute vector added this time, and obtains the magnitude thereof.

The vector information creation part 22 repeats the processing as described above until the magnitude of the test vector exceeds the prescribed value. Then, as described above, when the magnitude of the test vector becomes equal to or more than the prescribed value, the process proceeds to step S264.

When it proceeded to step S264, the vector information creation part 22 registers vector information (coordinates, vector ID, magnitude) of the test vector whose magnitude is determined to exceed the prescribed value in step S263 in the third vector array, and empties the second vector array.

Next, in step S265, the vector information creation part 22 determines whether there is an unprocessed minute vector or not in the first vector array. When there is no unprocessed minute vector as a result of this determination, the processing by the flowchart of FIG. 26 is finished. On the other hand, when there is an unprocessed minute vector, the process returns to step S261.

The stroke characteristic amount derivation part 23, in step S104 of FIG. 10, derives characteristic amounts of the stroke based on the vector information registered in the third vector array, and stores them in the stroke information.

By executing the flowchart of FIG. 26, a plurality of minute vectors can be combined and converted into a vector having a certain magnitude. Thus, data can be compressed, and characteristics of signs can be comprehended easily.

Second Example

In this example, processing of correcting wobbling of a straight vector will be explained.

When a person draw a straight line with the input means, such as a finger or a pen, on the screen of the touch display 17, the straight line may wobble. Unless this wobbling is absorbed to make it one straight line, the stroke recognition part 25 may erroneously determine a stroke which should be determined correctly as a straight line as, for example, an arc line.

Figure 27:
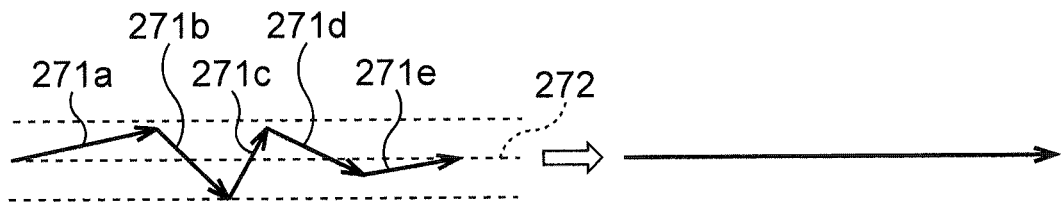
FIG. 27 is a diagram explaining a second example of the method of combining a plurality of minute vectors.

FIG. 27 is a diagram explaining a second example of the method of combining a plurality of minute vectors.

In this example, as illustrated in FIG. 27, the vector information creation part 22 combines vectors from the first vector to the last vector into one vector when the distance from a straight line linking the starting point of the first vector and the end point of the last vector is equal to or less than a prescribed value. Then, the vector information creation part 22 replaces vector information (coordinates, vector IDs, magnitudes) of the original vectors before combining into one with vector information (coordinates, vector ID, magnitude) of the vector combined into one.

Figure 28:
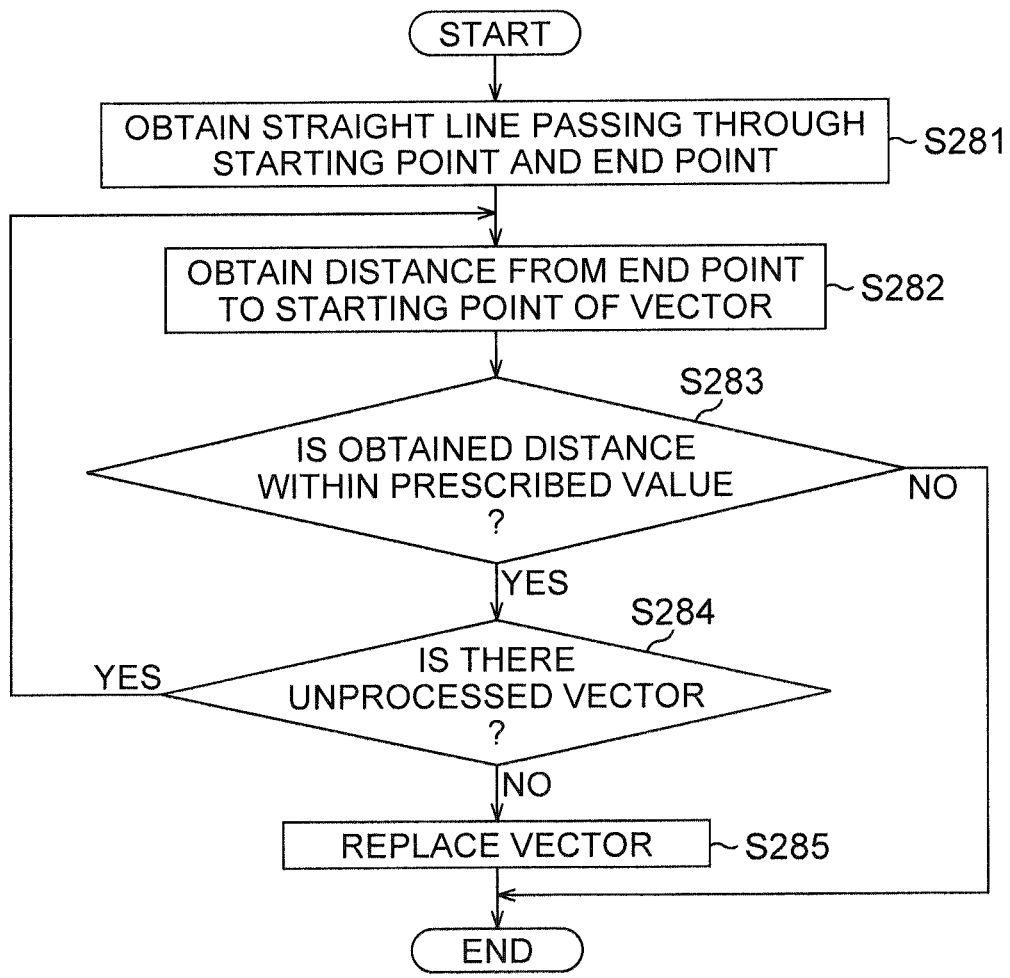
FIG. 28 is a flowchart explaining a second example of combination processing of combining a plurality of minute vectors.

With reference to a flowchart of FIG. 28, the second example of the combination processing of combining a plurality of minute vectors will be explained. The flowchart of FIG. 28 is executed when, for example, vector information of vectors is stored in the vector array in step S104 of FIG. 10.

In step S281, the vector information creation part 22 obtains an equation of a line 272 linking the starting point of a first vector 271a and the end point of a last vector 271e.

Next, in step S282, the vector information creation part 22 selects one unselected vector from among vectors 271a to 271e from the first vector 271a to the last vector 271e. Then, the vector information creation part 22 draws a normal down to a straight line 272 obtained in step S281 from the end point of the selected vector, and obtains a distance between a leg of the normal (intersection of the normal and the straight line 272) and the end point of the selected vector.

Next, in step S283, the vector information creation part 22 determines whether the distance obtained in step S282 is equal to or less than a prescribed value or not. When the distance obtained in step S282 is not equal to or less than the prescribed value as a result of this determination, the processing by the flowchart of FIG. 28 is finished.

On the other hand, when the distance obtained in step S282 is equal to or less than the prescribed value, the process proceeds to step S284.

When it proceeded to step S284, the vector information creation part 22 determines whether there is an unprocessed vector or not. When there is an unprocessed vector as a result of this determination, the process returns to step S282. Then, the vector information creation part 22 performs the processing of the next vector. On the other hand, when there is no unprocessed vector, the process proceeds to step S285.

When it proceeded to step S285, the vector information creation part 22 performs replacement of vectors. Specifically, the vector information creation part 22 generates vector information of a vector whose starting point is the starting point of the first vector of a vector array of stroke information, and whose end point is the end point of the last vector thereof. Then, the vector information creation part 22 deletes all vector information of original vectors stored in the vector array of the stroke information, and stores the vector information of the generated vector in the vector array. Then, the processing by the flowchart of FIG. 28 is finished.

The stroke characteristic amount derivation part 23, in step S104 of FIG. 10, derives the characteristic amounts of the stroke based on the vector information registered in the vector array, and stores them in the stroke information. At this time, when the vector information is rewritten according to the flowchart of FIG. 28, the stroke characteristic amount derivation part 23 derives the characteristic amounts of the stroke based on the rewritten vector information. On the other hand, according to the flowchart of FIG. 28, when the vector information is not rewritten, the stroke characteristic amount derivation part 23 derives the characteristic amounts of the stroke based on individual pieces of vector information.

By executing the flowchart of FIG. 28, as long as the distance from the straight line linking the starting point of a first vector and the end point of a last vector is less than or equal to the prescribed value, a plurality of minute vectors from the first vector to the last vector can be combined into one vector. Thus, data can be compressed, and characteristics of signs can be comprehended easily.

Third Example

In this example, processing of grouping vectors by direction and, when vectors of a same group continue, combining these vectors into one will be explained.

Figure 29A:
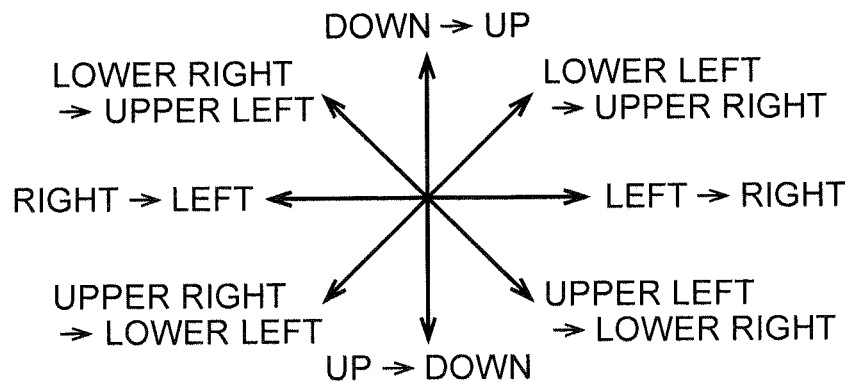
FIG. 29A is a diagram explaining an example of a method of grouping vectors by direction.

FIG. 29A is a diagram explaining an example of a method of grouping vectors by direction. In the example illustrated in FIG. 29A, the vector information creation part 22 groups vectors into nine groups based on inclinations of vectors.

In this example, the vector information creation part 22 groups vectors using vector IDs.

In the example explained with reference to FIG. 4, the vector IDs are nine IDs of "point", "down→up", "lower left→upper right", "left→right", "upper left→lower right", "up→down", "upper right→lower left", "right→left", "lower right→upper left". The method of giving the vector ID is as described above with reference to FIG. 4 (see (A) to (K) described above). In addition, the vector information creation part 22 may give an ID for grouping to each vector separately from the vector ID.

Figure 29B:
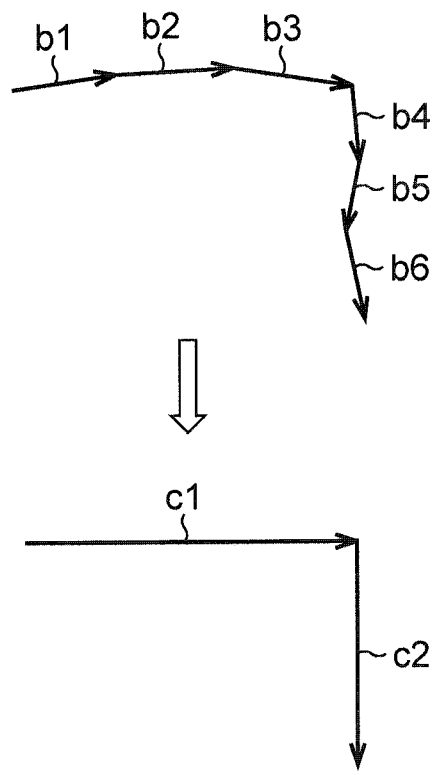
FIG. 29B is a diagram explaining a third example of the method of combining a plurality of minute vectors.

FIG. 29B is a diagram explaining the third example of the method of combining a plurality of minute vectors.

In FIG. 29B, a stroke constituted of six vectors b1 to b6 will be illustrated as an example.

The vector IDs of first three vectors b1, b2, b3 are "left→right". In this case, as illustrated in the lower diagram of FIG. 29B, the vector information creation part 22 generates a vector c1 whose starting point is the starting point of the first vector b1, and whose end point is the end point of the third vector b3, and derives vector information (coordinates, vector ID, magnitude) of the vector c1.

Then, the vector information creation part 22 replaces vector information of the original three vectors b1, b2, b3 with the vector information of the vector c1. Moreover, the vector IDs of fourth to sixth vectors b4, b5, b6 are "up→down". Also in this case, the vector information creation part 22 generates a vector c2 whose starting point is the starting point of the fourth vector b4, and whose end point is the end point of the sixth vector b6, and replaces these three vectors with the vector c2.

Figure 30:
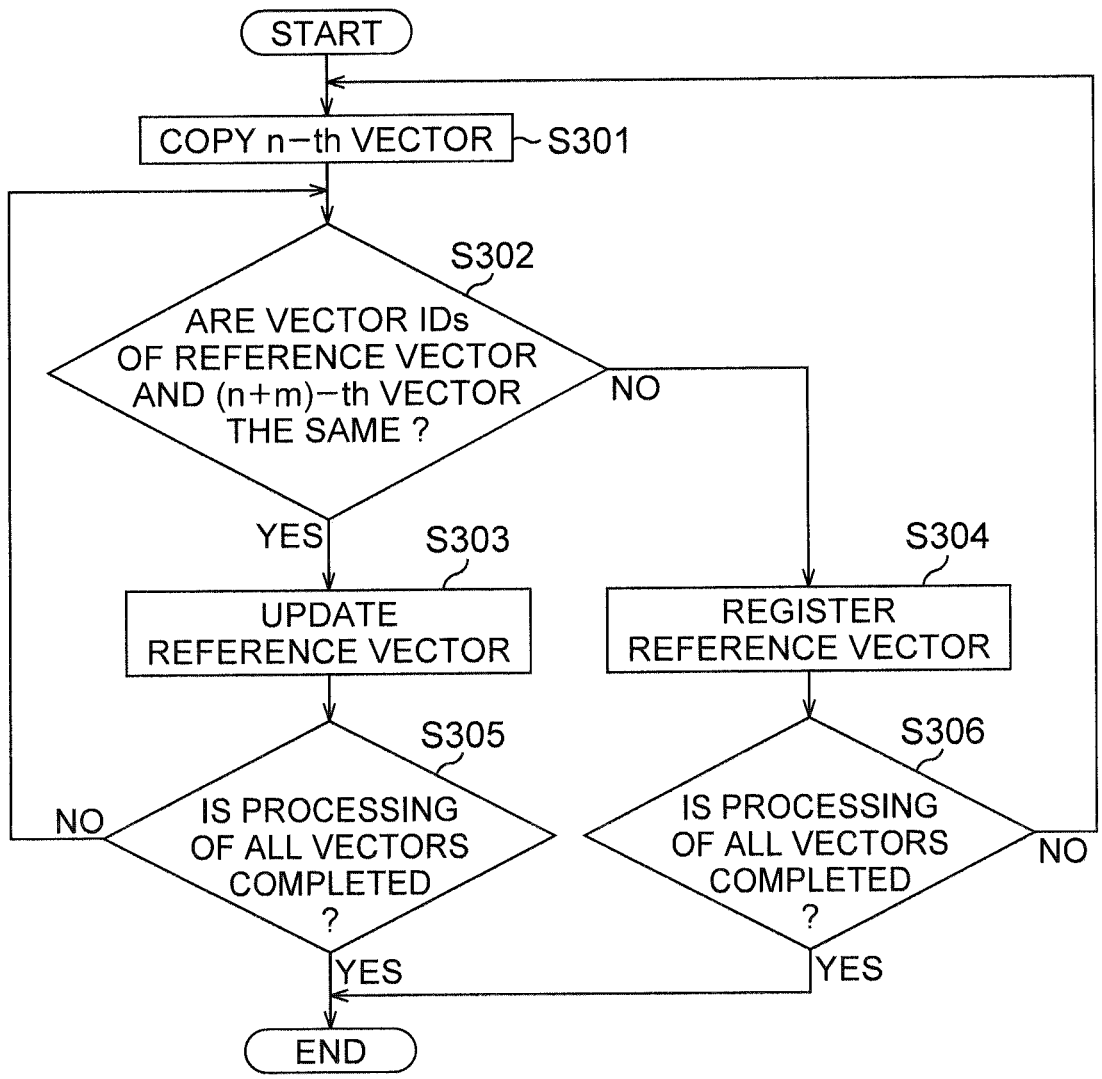
FIG. 30 is a flowchart explaining a third example of combination processing of combining a plurality of minute vectors.

With reference to a flowchart of FIG. 30, the third example of the combination processing of combining a plurality of minute vectors will be explained. The flowchart of FIG. 30 is executed when, for example, vector information of vectors is stored in the vector array in step S104 of FIG. 10.

In step S301, the vector information creation part 22 copies the n-th vector from the head in the vector array as a reference vector. The initial value of n is 1.

Next, in step S302, the vector information creation part 22 determines whether the vector ID of the reference vector and the vector ID of the (n+m)-th vector from the head in the vector array are the same or not. The initial value of m is 1.

When the vector ID of the reference vector and the vector ID of the (n+m)-th vector from the head in the vector array are the same as a result of this determination, the process proceeds to step S303. On the other hand, when the vector ID of the reference vector and the vector ID of the (n+m)-th vector from the head in the vector array are different, the process proceeds to step S304.

When it proceeded to step S303, the vector information creation part 22 changes the end point of the reference vector to the end point of the (n+m)-th vector. Then, the vector information creation part 22 recalculates the vector ID of the reference vector based on the position of the changed end point. Moreover, the vector information creation part 22 increments m (adds 1 to m). Then, the process proceeds to step S305, which will be described later.

On the other hand, when it proceeded to step S304, the vector information creation part 22 stores the vector information of the current reference vector in the vector array. At this time, the vector information creation part 22 replaces the vector information of the current reference vector with the vector information of the vector which the reference vector is based on. Moreover, the vector information creation part 22 lets n=n+m. Then, the process proceeds to step S306, which will be described later.

When it proceeded to step S305, the vector information creation part 22 determines whether the processing of all the vectors in the vector array is finished or not. When the processing of all the vectors in the vector array is finished as a result of this determination, the processing by the flowchart of FIG. 30 is finished.

On the other hand, when the processing of all the vectors in the vector array is not finished, the process returns to step S302 to perform the above-described processing.

Further, when it proceeded to step S306, the vector information creation part 22 determines whether the processing of all the vectors in the vector array is finished or not. When the processing of all the vectors in the vector array is finished as a result of this determination, the processing by the flowchart of FIG. 30 is finished.

On the other hand, when the processing of all the vectors in the vector array is not finished, the process returns to step S301 to perform the above-described processing.

The stroke characteristic amount derivation part 23, in step S104 of FIG. 10, derives the characteristic amounts of the stroke based on the vector information registered in the vector array, and stores them in the stroke information. At this time, with respect to the vector which is taken as the reference vector according to the flowchart of FIG. 30, the stroke characteristic amount derivation part 23 derives the characteristic amounts of the stroke based on the vector information of this reference vector.

By executing the flowchart of FIG. 30, when a plurality of minute vectors are grouped based on inclinations of the vectors, and when vectors of a same group continue, these vectors can be combined into one. Thus, data can be compressed, and characteristics of signs can be comprehended easily.

Fourth Example

In this example, the processing of combining a plurality of vectors in the vicinity of a threshold of inclination into one vector will be explained.

In this example, when a plurality of vectors are categorized by direction, categorizing of vectors is performed by inclination of vector. A person may draw a straight line close to the threshold of inclination with the input means, such as a finger or a pen, on the screen of the touch display 17. In this case, due to shaking of a hand, or the like, the vector ID of a vector may become a vector ID to be given when the inclination exceeds the threshold, and the vector ID of another vector may become a vector ID to be given when the inclination is lower than or equal to the threshold. Then, the vector ID of a vector desired to be actually the same ID may become a different ID, which may result in that vectors cannot be combined by the method of the above-described third example.

Then, in this example, a plurality of vectors in the vicinity of the threshold of inclination are combined into one vector.

Here, when the inclination a of a vector is less than −2.0, the vector ID of this vector is "down→up" (see FIG. 4). Further, when the inclination a of a vector is −2.0 to −0.5, the vector ID of this vector is "lower left→upper right" (see FIG. 4). Further, when the inclination a of a vector is −0.5 or more, the vector ID of this vector is "left→right" (see FIG. 4).

The combination processing for determining a vector ID in this manner will be explained with reference to FIG. 31A and FIG. 31B.

Figure 31A:
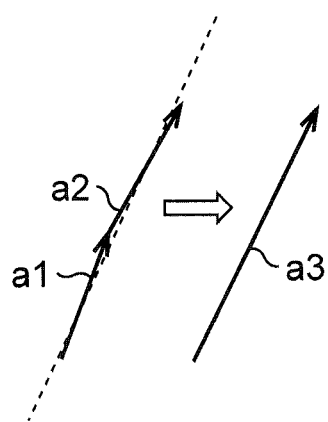
FIG. 31A is a diagram explaining a first mode of a fourth example of the method of combining a plurality of minute vectors.

FIG. 31A is a diagram explaining a first mode of a fourth example of the method of combining a plurality of minute vectors. Further, FIG. 31B is a diagram explaining a second mode of the fourth example of the method of combining a plurality of minute vectors.

As illustrated in FIG. 31A, the vector information creation part 22 combines a vector a1 and a vector a2 with an inclination a close to −2.0 into one vector a3.

Figure 31B:
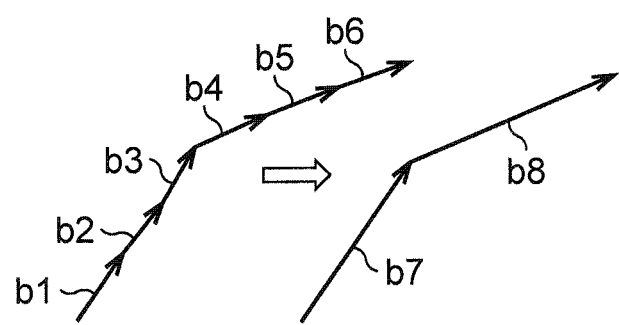
FIG. 31B is a diagram explaining a second mode of the fourth example of the method of combining a plurality of minute vectors.

As illustrated in FIG. 31B, the vector information creation part 22 combines a vector b1, a vector b2, and a vector b3 in the vicinity of the threshold of inclination into one vector b7. Further, the vector information creation part 22 combines a vector b4, a vector b5, and a vector b6 in the vicinity of the threshold of inclination into one vector b8.

Figure 32:
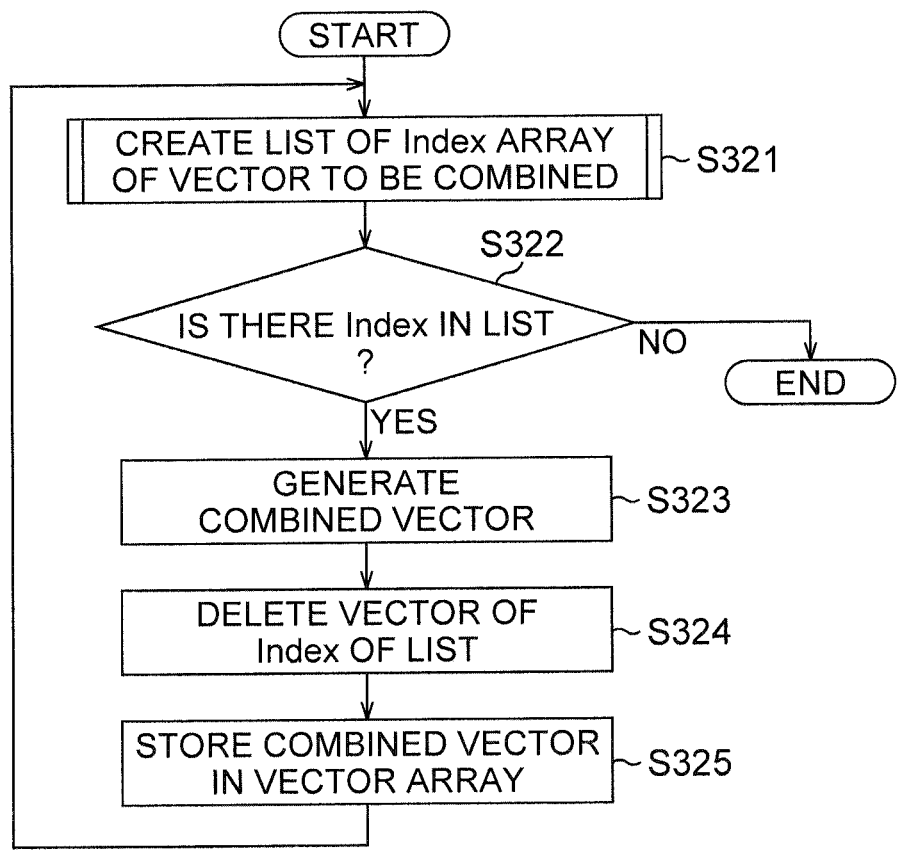
FIG. 32 is a flowchart explaining a fourth example of combination processing of combining a plurality of minute vectors.

With reference to a flowchart of FIG. 32, the fourth example of the combination processing of combining a plurality of minute vectors will be explained. The flowchart of FIG. 32 is executed when, for example, vector information of vectors is stored in the vector array in step S104 of FIG. 10.

In step S321, the vector information creation part 22 generates a list of Index array of vectors to be combined from the vector array. Details of this processing will be described later with reference to the flowchart of FIG. 33.

Next, in step S322, the vector information creation part 22 determines whether there is Index or not in the list created in step S321. When Index in the list is empty as a result of this determination, the processing of the flowchart of FIG. 32 is finished.

On the other hand, when there is Index in the list, the process proceeds to step S323.

When it proceeded to step S323, the vector information creation part 22 generates a combined vector. The combined vector is a vector whose starting point is the starting point of the first vector in the Index array, and whose end point is the end point of the last vector of the Index array. Then, the vector information creation part 22 generates vector information (coordinates, vector ID, magnitude) of the combined vector.

Next, in step S324, the vector information creation part 22 deletes vector information of the vector of Index of the Index array from the vector array.

Next in step S325, the vector information creation part 22 inserts vector information of the combined vector in the position of first Index of the vector array. Thereafter, the process returns to step S321 to generate an Index array of vectors to be combined.

The stroke characteristic amount derivation part 23 derives the characteristic amounts of the stroke based on vector information registered in the vector array in step S104 of FIG. 10, and stores it in the stroke information. At this time, according to the flowchart of FIG. 30, in a part where the vector information of the combined vector is inserted, the stroke characteristic amount derivation part 23 derives the characteristic amounts of the stroke based on the vector information of the combined vector.

Next, an example of the processing of step S321 of FIG. 32 will be explained with reference to the flowchart of FIG. 33. As described above, in step S321, a list of Index array of vectors to be combined is generated from the vector array.

In step S331, the vector information creation part 22 checks the vector ID of vector ID of vector n and the vector ID (direction) of vector n+1, and determines whether the vectors n, n+1 are next to each other or not. The initial value of n is 1. Further, n denotes the order from the head of vectors in the vector array.

When the vectors n, n+1 are adjacent to each other as a result of this determination, the vector information creation part 22 stores the vector ID of the vector n or vector n+1 as a temporary storage vector ID according to the combination of vectors n, n+1.

Moreover, the vector information creation part 22 sets an X-axis flag indicating whether a threshold of the vector IDs of vectors n, n+1 adjacent to each other is an inclination close to the X-axis or not.

FIG. 34 is a diagram illustrating an example of the relation of the vector IDs of the two adjacent vectors n, n+1, the temporary storage vector ID, and the X-axis flag. The relation 340 illustrated in FIG. 34 is generated by the vector information creation part 22.

Next, in step S332, the vector information creation part 22 branches the process according to the present temporary storage vector ID and the previous temporary storage vector ID.

Specifically, when the present temporary storage vector ID is not no direction, the process proceeds to step S333 (case 1).

Further, when the present temporary storage vector ID is no direction and also the previous temporary storage vector ID is no direction, the process returns to step S331 (case 2). At this time, the vector information creation part 22 increments n (adds 1 to n).

Figure 33:
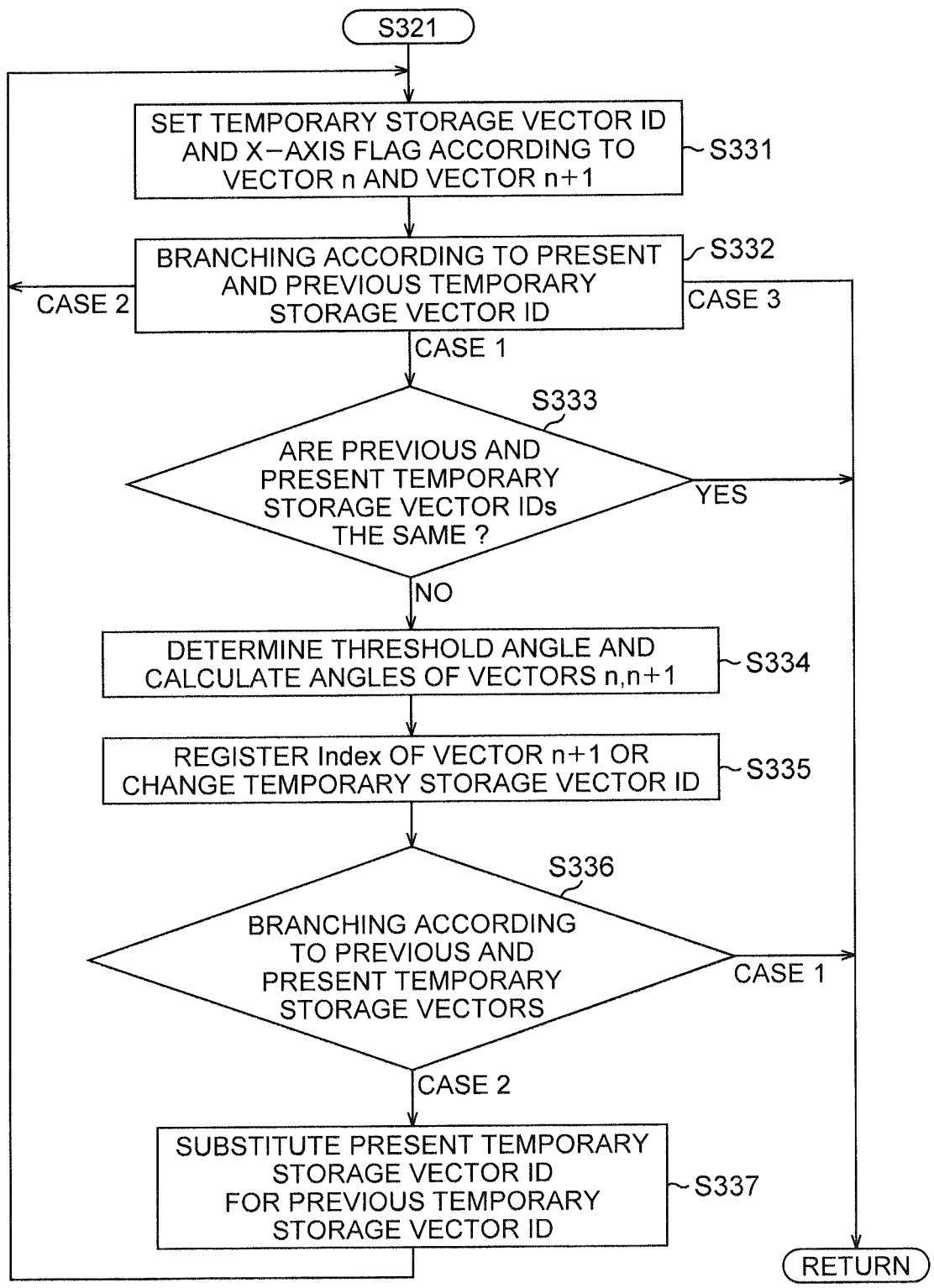
FIG. 33 is a flowchart explaining an example of processing of step S321 of FIG. 32.

Further, when the present temporary storage vector ID is no direction and the previous temporary storage vector ID is other than no direction, the processing by the flowchart of FIG. 33 is finished (case 3).

When it proceeded to step S333, the vector information creation part 22 determines whether the previous temporary storage vector ID and the present temporary storage vector ID are the same or not. As a result of this determination, when the previous temporary storage vector ID and the present temporary storage vector ID are the same, the processing by the flowchart of FIG. 33 is finished.

On the other hand, when the previous temporary storage vector ID and the present temporary storage vector ID are different, the process proceeds to step S334.

When it proceeded to step S334, the vector information creation part 22 determines a threshold angle of vector according to the X-axis flag and the temporary storage vector ID.

FIG. 35 is a diagram illustrating an example of the relation of the X-axis flag, the temporary storage vector ID, a threshold upper limit, and a threshold lower limit. Note that the threshold upper limit and the threshold lower limit are angles when the X-axis is 0°. The relation 350 illustrated in FIG. 35 is registered in advance in the handwritten music sign recognition device 10 as a table for example.

The vector information creation part 22 determines the threshold angle (threshold upper limit and threshold lower limit) of vector based on the relation illustrated in FIG. 35. Moreover, the vector information creation part 22 obtains the angle of vector n and the angle of vector n+1. Note that these angles are an angle in a predetermined direction (for example, when the counterclockwise direction is positive) when the X-axis is 0°. The angles illustrated in FIG. 35 are angles determined based on the same criteria as these angles.

Next, in step S335, when the angle of vector n and the angle of vector n+1 are both within the range of threshold angles determined in step S334 (within the range from the threshold lower limit to the threshold upper limit), the vector information creation part 22 registers Index of vector n+1 in the Index array of vectors to be combined.

At this time, if n=1, the vector information creation part 22 registers Index of vector n in the Index array of vectors to be combined, and then registers Index of vector n+1. Then, the process proceeds to step S336.

On the other hand, when the angle of vector n or the angle of vector n+1 are not within the range of threshold angles determined in step S334 (within the range from the threshold lower limit to the threshold upper limit), the vector information creation part 22 changes the temporary storage vector ID to no direction. Then, the process proceeds to step S336.

When it proceeded to step S336, the vector information creation part 22 checks the present and previous temporary storage vector IDs. When the previous temporary stored vector ID is not no direction and is different from the present temporary storage vector ID, the processing by the flowchart of FIG. 33 is finished (case 1). On the other hand, in other cases, the process proceeds to step S337 (case 2).

When it proceeded to step S337, the vector information creation part 22 substitutes the present temporary storage vector ID for the previous temporary storage vector ID. Further, the vector information creation part 22 increments n (adds 1 to n). Then, the process returns to step S331.

By executing the flowcharts of FIG. 32 and FIG. 33, a plurality of vectors in the vicinity of the threshold of inclination can be combined into one vector. Therefore, when a straight line close to the threshold of inclination is drawn, it is possible to prevent the vector ID of a vector from becoming a vector ID to be given when the inclination exceeds the threshold, and prevent the vector ID of another vector from becoming a vector ID to be given when the inclination is lower than or equal to the threshold, due to shaking of the hand, or the like. Thus, data can be compressed, and characteristics of signs can be comprehended easily.

As described above, in this embodiment, it is possible to reduce the amount of calculations necessary when a sign for which many vectors are generated by handwriting is recognized.

Note that at least two of the above-described first to fourth examples may be combined.

Third Embodiment

Next, a third embodiment will be explained. In the first embodiment, the case that the stroke recognition part 25 uses the connection type, which is one of characteristic amounts of a stroke, for determining whether or not there is an acute angle point in the stroke to be recognized is explained as an example.

As explained in the first embodiment, as one characteristic of movement of the input means, such as a human finger or pen, there is a connection type of a vector and a vector inputted next to this vector. In the example explained in the first embodiment, a vector is categorized into a connection type of any one of obtuse angle (=1), right angle (=2), acute angle (=3), and none of these (=0).

In this embodiment, the stroke recognition part 25 divides one stroke into a plurality of strokes at the position of an acute angle of the stroke. Then, the stroke recognition part 25 recognizes each of the divided strokes. In this manner, the stroke recognition part 25 can recognize the shapes of divided individual strokes more simply, and by the positional relation of the individual divided strokes, the sign of the stroke before being divided can be recognized simply and accurately.

Thus, this embodiment is made by adding the above-described processing as processing for the stroke recognition part 25 to recognize a stroke to the first embodiment. Therefore, in the explanation of this embodiment, same parts as those in the first embodiment are given the same reference numerals as those given in FIG. 1 to FIG. 24B, and detailed explanations thereof are omitted.

Figure 36:
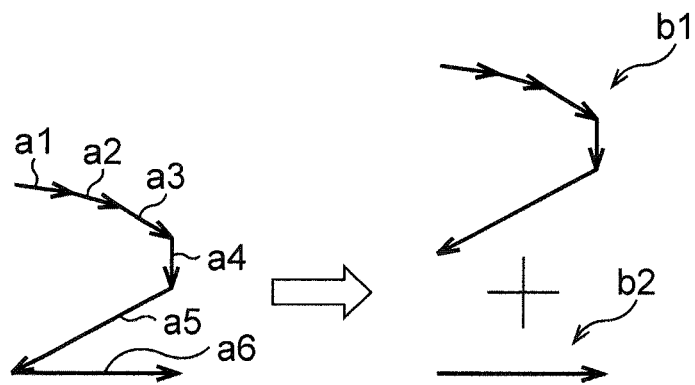
FIG. 36 is a diagram explaining an example of a method of dividing one stroke into a plurality of strokes and recognizing them.

FIG. 36 is a diagram explaining an example of a method of dividing one stroke into a plurality of strokes and recognizing them.

In the character "2" illustrated in the left diagram of FIG. 36, the connection type from the first vector a1 to the fifth vector a5 is an obtuse angle, and the connection type of the fifth vector a5 and the sixth vector a6 is an acute angle.

Then, the stroke recognition part 25 recognizes the first to fifth vectors a1 to a5 and the sixth vector a6 as different strokes. Then, as illustrated in the right diagram of FIG. 36, the stroke recognition part 25 divides the first to fifth vectors a1 to a5 and the sixth vector a6. Then, the stroke recognition part 25 recognizes that the sign of the stroke constituted of the first to fifth vectors a1 to a5 as an arc line b1. Further, the stroke recognition part 25 recognizes that the sign of the stroke constituted of the sixth vector a6 as a straight line b2. The method of recognizing them is as explained in the first embodiment. In this manner, the stroke recognition part 25 can recognize a simpler shape than that when the shape of the stroke on the left diagram of FIG. 36 is recognized.

Figure 37:
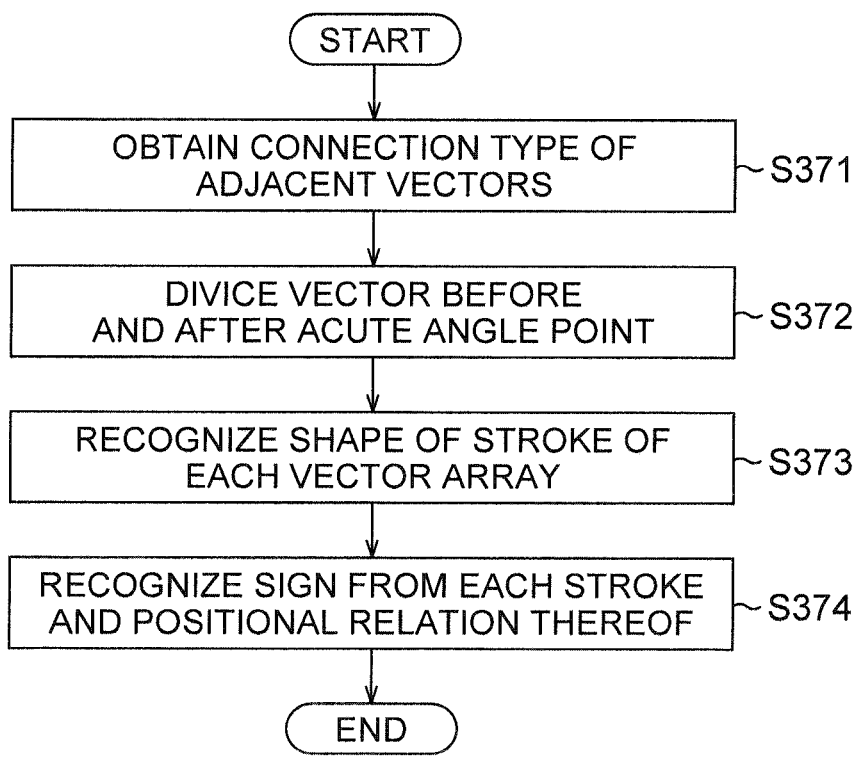
FIG. 37 is a flowchart explaining an example of the method of dividing one stroke into a plurality of strokes and recognizing them.

Next, an example of the method of dividing one stroke into a plurality of strokes and recognizing them will be explained with reference to a flowchart of FIG. 37. The flowchart of FIG. 37 is performed in, for example, step S143 and step S144 of FIG. 14.

In step S371, the stroke recognition part 25 obtains the connection type of two adjacent vectors in the order of input, and stores this connection type in a connection type array. When a character "2" is inputted as illustrated in FIG. 36, the stroke recognition part 25 stores an obtuse angle (=1), an obtuse angle (=1), an obtuse angle (=1), and an acute angle (=3) in the connection type array in this order.

Next, in step S372, the stroke recognition part 25 divides the original vector array into a vector array of vectors located before an acute angle point and a vector array of vectors located after the acute angle point based on the connection type array. The vector array is created by the number of adding 1 to the number of acute angle points (=number of acute angle points+1). Then, the stroke recognition part 25 deletes the original vector array.

When a character "2" is inputted as illustrated in FIG. 36, the stroke recognition part 25 creates two vector arrays.

In this case, the stroke recognition part 25 stores vector information (coordinates, vector ID, magnitude) of the vectors a1 to a5 in the first vector array of two vector arrays. Further, the stroke recognition part 25 stores vector information (coordinates, vector ID, magnitude) of the vector a6 in the second vector array of the two vector arrays.

Next, in step S373, the stroke recognition part 25 recognizes, in every vector array created in step S372, the shape of a stroke constituted of vectors included in this vector array.

In the example illustrated in FIG. 36, the stroke recognition part 25 recognizes the shape of a stroke constituted of vectors included in the first vector array and the shape of a stroke constituted of vectors included in the second vector array in the following manner.

<Regarding First Vector Array>

The stroke recognition part 25 determines whether the change in rotation direction is neither of clockwise and counterclockwise. The stroke recognition part 25 can determine the change in rotation direction by referring to, for example, a rotation direction derived by the stroke characteristic amount derivation part 23. In the example illustrated in FIG. 36, the rotation direction of the vectors included in the first vector array is clockwise and constant.

Further, the stroke recognition part 25 derives the total of rotation angles. In the example illustrated in FIG. 36, the total of rotation angles of the vectors included in the first vector array is less than 180°, and the rotation angle is constant. The stroke recognition part 25 can determine the total of rotation angles by referring to, for example, a rotation angle derived by the stroke characteristic amount derivation part 23.

From the above point, the stroke recognition part 25 can determine that the stroke constituted of the vectors included in the first vector array is an arc line.

Moreover, the stroke recognition part 25 derives following (a) to (h) with respect to the vectors included in the first vector array. Then, the stroke recognition part 25 determines based on the derived result what arc line the stroke constituted of the vectors included in the first vector array is.

(a) number of vectors directed rightward
(b) number of vectors directed leftward
(c) number of vectors directed downward
(d) number of vectors directed upward
(e) index of highest point
(f) index of lowest point
(g) index of leftmost point
(h) index of rightmost point The stroke recognition part 25 can derive the above (a) and (b) by referring to, for example, a left-right movement direction derived by the stroke characteristic amount derivation part 23.

The stroke recognition part 25 can derive the above (c) and (d) by referring to, for example, an up-down movement direction derived by the stroke characteristic amount derivation part 23.

The stroke recognition part 25 can derive each of the above (e), (f), (g), (h) by referring to, for example, a highest point Index, a lowest point Index, a leftmost point Index, a rightmost point Index derived by the stroke characteristic amount derivation part 23.

In the example illustrated in FIG. 36, the number of vectors directed from up to down is one or more, and the number of vectors directed from down to up is 0. Further, the index value of the rightmost point is not 0, and the index of the rightmost point is not the last point.

From the above conditions, the stroke recognition part 25 recognizes the stroke constituted of the vectors included in the first vector array is an arc line opening leftward.

<Regarding Second Vector Array>

The number of vectors included in the second vector array is one. The vector ID of the vector included in the second vector array is "left→right". The vector ID is created by the vector information creation part 22. As described above, the vector ID is derived based on the inclination of a vector, and the relation of starting point and end point of the vector.

Therefore, the stroke recognition part 25 recognizes that the stroke constituted of vectors included in the second vector array is a horizontal straight line.

Next, in step S374, the stroke recognition part 25 generates one stroke and recognizes it based on the shape of each stroke and the positional relation of this stroke. In the example illustrated in FIG. 36, there is a horizontal straight line b2 below the arc line b1 opening leftward. Therefore, the stroke recognition part 25 combines them to generate one stroke. Then, the stroke recognition part 25 recognizes the generated stroke as a character "2".

As described above, in this embodiment, a stroke is divided at a point where the angles of vectors of a handwritten-inputted sign changes at an acute angle, and each of the divided strokes is recognized individually. Therefore, even when a handwritten-inputted sign is complicated, this sign can be recognized accurately without retaining vast amounts of data.

In this embodiment, an example of recognizing a character "2" is illustrated, but it is also possible to divide one stroke at a point of changing acutely, and to recognize various characters and signs which is each recognizable.

Further, this embodiment can be realized by combining with the second embodiment.

Other Embodiments

Embodiments of the present invention as have been described can be realized by a computer executing a program. Further, means for supplying a program to a computer, for example a computer readable recording medium, such as a CD-ROM recording such a program, or a transmission medium transmitting such a program, can be applied as an embodiment of the present invention. Further, a program product, such as a computer readable recording medium recording the program can be applied as an embodiment of the present invention. The program, the computer readable recording medium, the transmission medium and the program product are included in the scope of the present invention.

Further, all the above-described embodiments of the present invention merely illustrate specific examples for carrying out the present invention, and the technical scope of the invention should not be construed as limited by these embodiments. That is, the invention may be implemented in various forms without departing from the technical spirit or main features thereof.

INDUSTRIAL APPLICABILITY

The present invention can be used as, for example, a device which automatically recognizes a sign inputted by handwriting by using an input means, such as a finger or a pen.

The invention claimed is:

1. A handwritten music sign recognition device, comprising:
a touch screen which obtains, as position information, a position of an input on a screen every time the input moves, from when the input touches the screen until when the input is moved away therefrom to form a stroke;

a processor, the processor configured to:

divide the stroke into one or more vectors, each vector being a straight line or a point;

create attributes of a vector indicating a trace of movement of the input as vector information based on the position information obtained by the touch screen, the position information including a start point having coordinates $X_1$ and $Y_1$ and an end point having coordinates $X_2$ and $Y_2$;

create vector information for each vector based on an inclination of the vector calculated from the difference between $Y_1$ and $Y_2$ relative to the difference between $X_1$ and $X_2$, the vector information including a vector ID indicating one of nine types of vectors including that a direction of the vector is down to up, lower left to upper right, left to right, upper left to lower right, up to down, upper right to lower left, right to left, and lower right to upper left or that the vector is a directionless vector;

store one or a plurality of pieces of stroke information for each object to be recognized in a memory, the stroke information including the vector information with respect to the one or more vectors based on the position information from when the input touches the screen until when the input is moved away therefrom;

derive a characteristic amount of a stroke being a trace of movement of the input from when the input touches the screen until when the input is moved away therefrom, based on the vector information included in the stroke information; and recognize a sign indicated by the stroke based on at least one of the vector information and the characteristic amount of the stroke, wherein at least one of the two or more types of the characteristic amount of the stroke and the vector information with respect to the stroke is stored in a table arranged by vector ID, and wherein the processor derives as the characteristic amount of the stroke all of:

a starting point-end point distance which is a distance of a straight line linking a starting point and an end point of the stroke;

coordinates of four corners and coordinates of a center of a rectangle inscribed on the stroke;

a connection type indicating a value corresponding to an angle formed by a vector included in the stroke and a vector inputted next to the vector;

a rotation direction from a vector included in the stroke to a vector inputted next to the vector;

a rotation angle from a vector included in the stroke to a vector inputted next to the vector;

a left-right movement direction indicating a direction of left and right as a direction in which a vector included in the stroke is directed;

an up-down movement direction indicating an up-down direction as a direction in which a vector included in the stroke is directed;

a leftmost point index indicating a leftmost vector among vectors included in the stroke;

a rightmost point index indicating a rightmost vector among vectors included in the stroke;

a highest point index indicating a highest vector among vectors included in the stroke; and a lowest point index indicating a lowest vector among vectors included in the stroke, and stores the derived characteristic amount of the stroke in the stroke information.

2. The handwritten music sign recognition device according to claim 1, wherein the processor recognizes, based on one or a plurality of the strokes, a sign indicated by the object constituted of the one or plurality of the strokes.

3. The handwritten music sign recognition device according to claim 2, wherein the processor recognizes a sign indicated by the object constituted of the plurality of the strokes based on positions of the plurality of the strokes.

4. The handwritten music sign recognition device according to claim 2, wherein, if there is an input of another one of the strokes within a given length of time since an input of the one stroke is finished, the processor waits until this input is completed, wherein, if there is no input of another one of the strokes within a given length of time since an input of the one stroke is finished, the processor starts recognizing an unrecognized stroke at this time point, and wherein the processor starts recognizing, based on the position of one or a plurality of the strokes, a sign indicated by the object constituted of the one or plurality of the strokes.

5. The handwritten music sign recognition device according to claim 2, wherein when there is a predetermined operation by a user on the screen, the processor starts recognizing an unrecognized stroke at a time when the operation is performed, and wherein the processor starts recognizing, based on the position of one or a plurality of the strokes, a sign indicated by the object constituted of the one or plurality of the strokes.

6. The handwritten music sign recognition device according to claim 2, wherein a staff is displayed on the screen, and wherein upon recognizing that a sign indicating the object is a music sign by that the object is a figure corresponding to a music sign, the processor recognizes a pitch of the music sign based on a position of the object on the staff.

7. The handwritten music sign recognition device according to claim 1, wherein the processor combines a plurality of the vectors into one vector, and creates attributes of the combined vector as the vector information.

8. The handwritten music sign recognition device according to claim 7, wherein when a distance of a straight line linking a starting point of the vector and an end point of the vector connected to the vector directly or via another one of the vectors is equal to or less than a predetermined value, the processor combines a plurality of the vectors into one vector.

9. The handwritten music sign recognition device according to claim 7, wherein when a distance between a straight line linking a starting point of the vector and an end point of the vector connected to the vector directly or via another one of the vectors and an end point of the plurality of vectors is equal to or less than a predetermined value, the processor combines a plurality of the vectors into one vector.

10. The handwritten music sign recognition device according to claim 7, wherein the processor categorizes the vectors under a plurality of categories according to directions of the vectors, and combines, when the categories of a plurality of the vectors connected to each other are the same, the plurality of the vectors into one vector.

11. The handwritten music sign recognition device according to claim 7, wherein the processor derives, according to directions of two vectors connected in positions adjacent to each other, a range of inclination for each of these two vectors and combines, when each of inclinations of these two vectors is within the range derived with respect to the vectors, these two vectors into one vector.

12. The handwritten music sign recognition device according to claim 1,
wherein the connection type indicates a value according to an angle formed by a vector included in the stroke and a vector inputted next to the vector, and
wherein when the value of the connection type is a value indicating that the angle of two of the vectors is an acute angle, the processor divides the stroke at a point indicating the acute angle, and individually recognizes, for each of the divided strokes, a sign indicated by the stroke.

13. The handwritten music sign recognition device according to claim 12, wherein the processor recognizes, based on one or a plurality of the strokes, a sign indicated by the object constituted of the one or plurality of the strokes.

14. The handwritten music sign recognition device according to claim 13, wherein the processor recognizes a sign indicated by the object constituted of the plurality of the strokes based on positions of the plurality of the strokes.

15. The handwritten music sign recognition device according to claim 1, wherein the processor recognizes a sign indicated by the object constituted of a plurality of strokes and at least one directionless vector, the strokes not connected to one another.

16. The handwritten music sign recognition device according to claim 1, wherein the characteristic amount of the stroke and the vector information stored in a table includes one of:
a rotation direction from a target vector included in the stroke to a vector inputted next to the target vector; and
a rotation angle from a target vector included in the stroke to a vector inputted next to the target vector.

17. A computer readable non-transitory recording medium recording a handwritten music sign recognition program causing a computer to execute:
a touch information obtaining step which obtains, as position information, a position of an input step on a screen every time the input step moves, from when the input step touches the screen until when the input step is moved away therefrom to form a stroke;
a division step which divides the stroke into one or more vectors, each vector being a straight line or a point;
a vector information creation step which creates attributes of a vector indicating a trace of movement of the input step as vector information based on the position information obtained by the touch information obtaining step, the position information including a start point having coordinates $X_1$ and $Y_1$ and an end point having coordinates $X_2$ and $Y_2$;
a vector information step which creates vector information for each vector based on an inclination of the vector calculated from the difference between $Y_1$ and $Y_2$ relative to the difference between $X_1$ and $X_2$, the vector information including a vector ID indicating one of nine types of vectors including that a direction of the vector is down to up, lower left to upper right, left to right, upper left to lower right, up to down, upper right to lower left, right to left, and lower right to upper left or that the vector is a directionless vector;
a stroke information storage step which stores one or a plurality of pieces of stroke information for each object to be recognized, the stroke information including the vector information with respect to the one or more vectors created by the vector information creation step based on the position information from when the input step touches the screen until when the input step is moved away therefrom;
a stroke characteristic amount derivation step which derives a characteristic amount of a stroke being a trace of movement of the input step from when the input step touches the screen until when the input step is moved away therefrom, based on the vector information included in the stroke information; and
a sign recognition step which recognizes a sign indicated by the stroke based on at least one of the vector information and the characteristic amount of the stroke, wherein at least one of the two or more types of the characteristic amount of the stroke and the vector information with respect to the stroke is stored in a table arranged by vector ID, wherein the processor derives as the characteristic amount of the stroke all of:
a starting point-end point distance which is a distance of a straight line linking a starting point and an end point of the stroke;
coordinates of four corners and coordinates of a center of a rectangle inscribed on the stroke;
a connection type indicating a value corresponding to an angle formed by a vector included in the stroke and a vector inputted next to the vector;
a rotation direction from a vector included in the stroke to a vector inputted next to the vector;
a rotation angle from a vector included in the stroke to a vector inputted next to the vector;
a left-right movement direction indicating a direction of left and right as a direction in which a vector included in the stroke is directed;
an up-down movement direction indicating an up-down direction as a direction in which a vector included in the stroke is directed;
a leftmost point index indicating a leftmost vector among vectors included in the stroke;
a rightmost point index indicating a rightmost vector among vectors included in the stroke;
a highest point index indicating a highest vector among vectors included in the stroke; and
a lowest point index indicating a lowest vector among vectors included in the stroke, and stores the derived characteristic amount of the stroke in the stroke information.

* * * * *